(12) United States Patent
Sato

(10) Patent No.: US 8,699,827 B2
(45) Date of Patent: Apr. 15, 2014

(54) IMAGING APPARATUS, SIGNAL PROCESSING METHOD, AND PROGRAM

(75) Inventor: Yutaka Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 13/218,540

(22) Filed: Aug. 26, 2011

(65) Prior Publication Data

US 2012/0051630 A1   Mar. 1, 2012

(30) Foreign Application Priority Data

Aug. 31, 2010 (JP) ................................ P2010-193692

(51) Int. Cl.
*G06K 9/54* (2006.01)
*G06K 9/60* (2006.01)

(52) U.S. Cl.
USPC ........................................................ 382/305

(58) Field of Classification Search
USPC ......................................... 382/305, 162, 254
See application file for complete search history.

(56) References Cited

U.S. PATENT DOCUMENTS

| 4,297,579 | A  | * | 10/1981 | Spaeth ........................... 250/343 |
| 4,853,765 | A  | * | 8/1989  | Katsumata et al. ........... 348/451 |
| 4,876,651 | A  | * | 10/1989 | Dawson et al. ................ 701/454 |
| 5,029,006 | A  | * | 7/1991  | Katsumata et al. ........... 348/581 |
| 5,064,973 | A  | * | 11/1991 | Zinn et al. ..................... 200/51.1 |
| 6,028,646 | A  | * | 2/2000  | Jeong et al. .................... 348/645 |
| 6,556,725 | B1 | * | 4/2003  | Kondo et al. .................. 382/305 |
| 7,184,590 | B2 | * | 2/2007  | Lee ................................ 382/181 |
| 7,349,579 | B2 | * | 3/2008  | Kadowaki et al. ............ 382/240 |
| 8,107,315 | B2 | * | 1/2012  | Chen ......................... 365/233.13 |
| 8,189,008 | B2 | * | 5/2012  | Julio ............................. 345/581 |
| 2003/0031375 | A1 | * | 2/2003 | Enomoto ....................... 382/255 |
| 2004/0207734 | A1 | * | 10/2004 | Horiuchi .................... 348/229.1 |
| 2005/0140787 | A1 | * | 6/2005 | Kaplinsky .................... 348/207.1 |
| 2008/0095408 | A1 | * | 4/2008 | Yokohata et al. ............. 382/106 |
| 2008/0122953 | A1 | * | 5/2008 | Wakahara et al. ............ 348/241 |
| 2009/0213238 | A1 | * | 8/2009 | Hara .......................... 348/222.1 |
| 2010/0244945 | A1 | * | 9/2010 | Hahn et al. .................... 327/553 |

* cited by examiner

*Primary Examiner* — Michelle Entezari
(74) *Attorney, Agent, or Firm* — Frommer Lawrence & Haug LLP; William S. Frommer; Ellen Marcie Emas

(57) ABSTRACT

An imaging apparatus controls an input/output path of a memory differently for normal image generation and for wide dynamic range image generation. For normal image generation, image signals are stored into and read from a memory after image correction. For wide dynamic range image generation, image signals are stored into and read from the memory before the image signals are corrected.

20 Claims, 20 Drawing Sheets

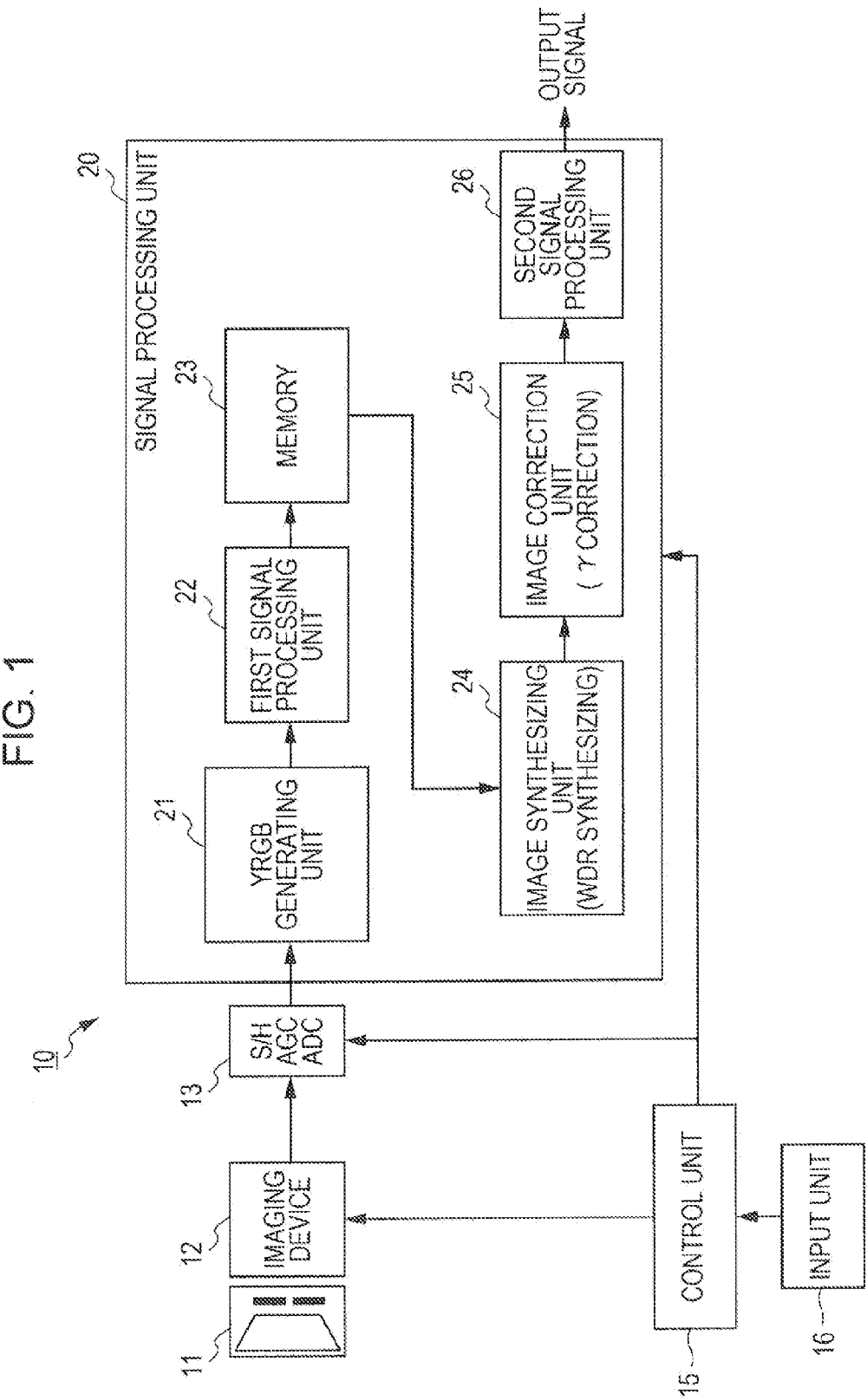

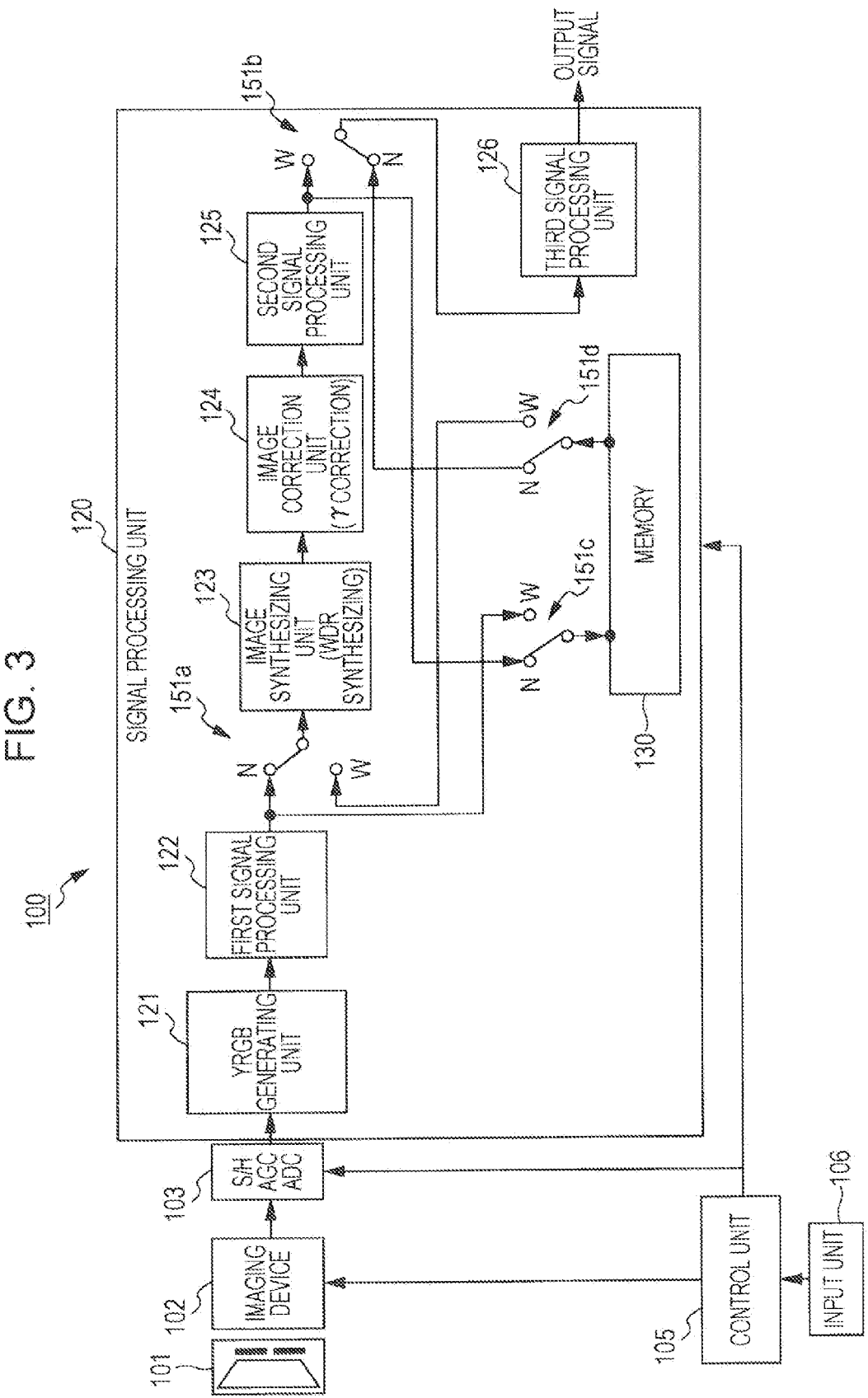

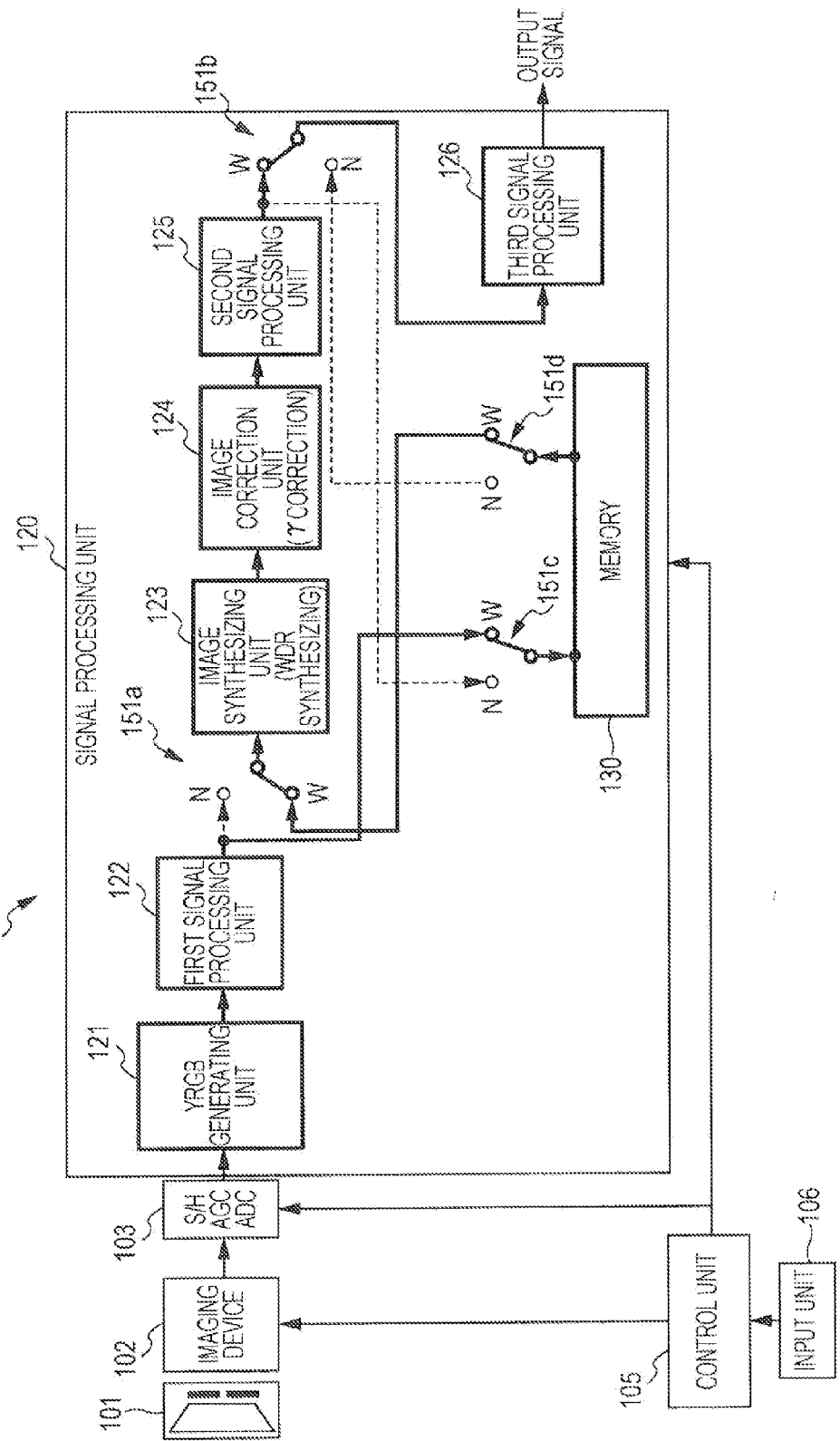

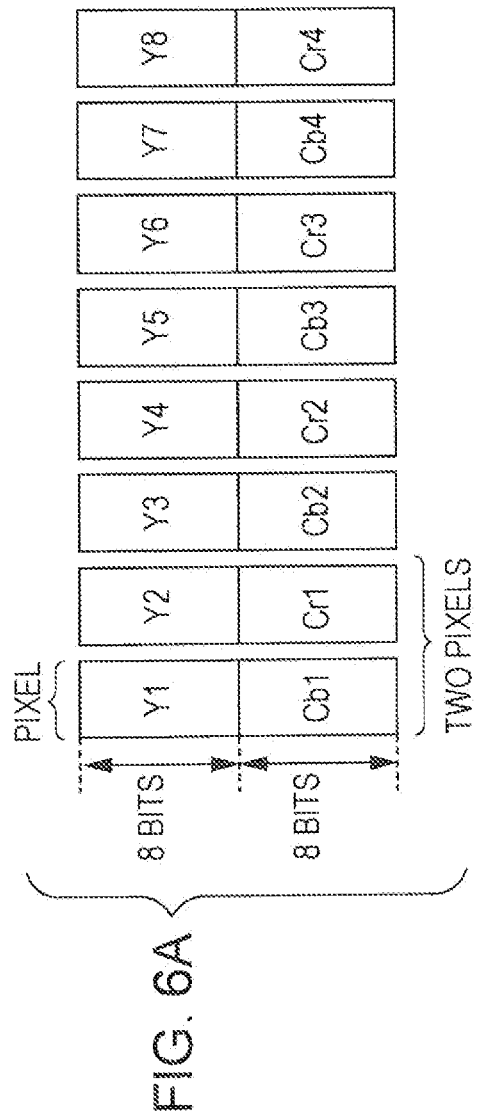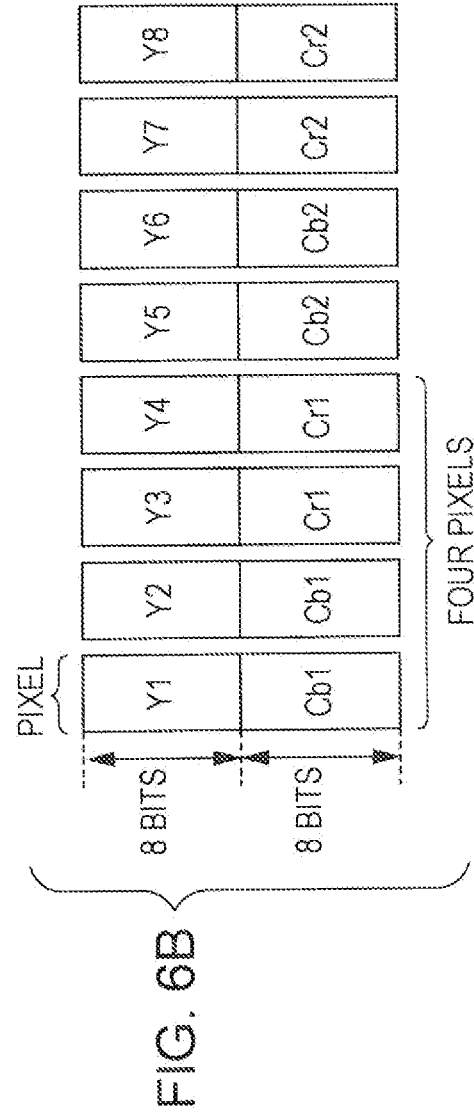

FIG. 8

| | | t0 | t1 | t2 | t3 | t4 | t5 | t6 |
|---|---|---|---|---|---|---|---|---|
| (1) | IMAGING DEVICE EXPOSURE | VI1 | VI2 | VI3 | VI4 | VI5 | VI6 | |
| | OUTPUT | | VI2 | VI3 | VI4 | VI5 | VI6 | |
| (2) | SWITCH a | N | N | N | N | N | N | |
| | SWITCH c | N | N | N | N | N | N | |
| (3) | WRITE TO MEMORY ADDRESS | AD1 | AD2 | AD1 | AD2 | AD1 | AD2 | |
| | DATA | fl_1 | fl_2 | fl_3 | fl_4 | fl_5 | fl_6 | |
| (4) | READ FROM MEMORY ADDRESS | | AD1 | AD2 | AD1 | AD2 | AD1 | |
| | DATA | | fl_1 | fl_2 | fl_3 | fl_4 | fl_5 | |
| (5) | SWITCH d | | N | N | N | N | N | |
| | SWITCH b | | N | N | N | N | N | |
| (6) | IMAGING APPARATUS OUTPUT | | VO1 | VO2 | VO3 | VO4 | VO5 | |

FIG. 9

| | | t0 | t1 | t2 | t3 | t4 | t5 | t6 | TIME |
|---|---|---|---|---|---|---|---|---|---|
| (1) | IMAGING DEVICE EXPOSURE | ■ | ■ | ■ | ■ | ■ | ■ | ■ | |
| | OUTPUT | VIL1 | VIH1 | VIL2 | VIH2 | VIL3 | VIH3 | | |
| (2) | SWITCH a | W | W | W | W | W | W | | |
| | SWITCH c | W | W | W | W | W | W | | |
| (3) | WRITE TO MEMORY ADDRESS | AD1 | AD2 | AD3 | AD4 | AD1 | AD2 | | |
| | DATA | f2_L1 | f2_H1 | f2_L2 | f2_H2 | f2_L3 | f2_H3 | | |
| (4a) | READ FROM MEMORY 1 ADDRESS | | | AD1 | AD1 | AD3 | AD3 | | |
| | DATA | | | f2_L1 | f2_L1 | f2_L2 | f2_L2 | | |
| (4b) | READ FROM MEMORY 2 ADDRESS | | | AD2 | AD2 | AD4 | AD4 | | |
| | DATA | | | f2_H1 | f2_H1 | f2_H2 | f2_H2 | | |
| (5) | SWITCH d | | | W | W | W | W | | |
| | SWITCH b | | | W | W | W | W | | |
| (6) | IMAGING APPARATUS OUTPUT | | | WV11 | WV11 | WV22 | WV22 | | |

FIG. 10

| | | t0 | t1 | t2 | t3 | t4 | t5 | t6 |
|---|---|---|---|---|---|---|---|---|
| (1) | IMAGING DEVICE EXPOSURE | ▓ | ▓ | ▓ | ▓ | ▓ | ▓ | ▓ |
| | OUTPUT | VIL1 | VIH1 | VIL2 | VIH2 | VIL3 | VIH3 | |
| (2) | SWITCH a | W | W | W | W | W | W | |
| | SWITCH c | W | W | W | W | W | W | |
| (3) | WRITE TO MEMORY ADDRESS | AD1 | AD2 | AD3 | AD4 | AD1 | AD2 | |
| | DATA | f2_L1 | f2_H1 | f2_L2 | f2_H2 | f2_L3 | f2_H3 | |
| (4a) | READ FROM MEMORY 1 ADDRESS | | AD1 | AD1 | AD3 | AD1 | AD1 | |
| | DATA | | f2_L1 | f2_L1 | f2_L2 | f2_L3 | f2_L3 | |
| (4b) | READ FROM MEMORY 2 ADDRESS | | | AD2 | AD2 | AD4 | AD4 | |
| | DATA | | | f2_H1 | f2_H1 | f2_H2 | f2_H2 | |
| (5) | SWITCH d | | | W | W | W | W | |
| | SWITCH b | | | W | W | W | W | |
| (6) | IMAGING APPARATUS OUTPUT | | | WV11 | WV12 | WV22 | WV23 | |

FIG. 13

| | | t0 | t1 | t2 | t3 | t4 | t5 | t6 |
|---|---|---|---|---|---|---|---|---|
| (1) | IMAGING DEVICE EXPOSURE | ▨ | ▨ | ▨ | ▨ | ▨ | ▨ | ▨ |
| | OUTPUT | VIL1 | VIH1 | VIL2 | VIH2 | VIL3 | VIH3 | |
| (2) | SWITCH a | W | W | W | W | W | W | |
| | SWITCH c | W | W | W | W | W | W | |
| (3) | WRITE TO MEMORY ADDRESS | AD1 | AD2 | AD3 | AD4 | AD1 | AD2 | |
| | DATA | f2_L1 | f2_H1 | f2_L2 | f2_H2 | f2_L3 | f2_H3 | |
| (4a) | READ FROM MEMORY 1 ADDRESS | | | AD1o | AD1e | AD3o | AD3e | |
| | DATA | | | f2_L1o | f2_L1e | f2_L2o | f2_L2e | |
| (4b) | READ FROM MEMORY 2 ADDRESS | | | AD2o | AD2e | AD4o | AD4e | |
| | DATA | | | f2_H1o | f2_H1e | f2_H2o | f2_H2e | |
| (5) | SWITCH d | | | W | W | W | W | |
| | SWITCH b | | | W | W | W | W | |
| (6) | IMAGING APPARATUS OUTPUT | | | WV11o | WV11e | WV22o | WV22e | |

FIG. 14

| | | | t0 | t1 | t2 | t3 | t4 | t5 | t6 |
|---|---|---|---|---|---|---|---|---|---|
| (1) | IMAGING DEVICE | EXPOSURE | ▓ | ▓ | ▓ | ▓ | ▓ | ▓ | ▓ |
| | | OUTPUT | VIL1 | VIH1 | VIL2 | VIH2 | VIL3 | VIH3 | |
| (2) | | SWITCH a | W | W | W | W | W | W | |
| | | SWITCH c | W | W | W | W | W | W | |
| (3) | WRITE TO MEMORY | ADDRESS | AD1 | AD2 | AD3 | AD4 | AD1 | AD2 | |
| | | DATA | f2_L1 | f2_H1 | f2_L2 | f2_H2 | f2_L3 | f2_H3 | |
| (4a) | READ FROM MEMORY 1 | ADDRESS | | | AD1e | AD1o | AD3e | AD3o | |
| | | DATA | | | f2_L1e | f2_L1o | f2_L2e | f2_L2o | |
| (4b) | READ FROM MEMORY 2 | ADDRESS | | | AD2e | AD2o | AD4e | AD4o | |
| | | DATA | | | f2_H1e | f2_H1o | f2_H2e | f2_H2o | |
| (5) | | SWITCH d | | | W | W | W | W | |
| | | SWITCH b | | | W | W | W | W | |
| (6) | IMAGING APPARATUS OUTPUT | | | | WV11e | WV11o | WV22e | WV22o | |

FIG. 15

| | | | t0 | t1 | t2 | t3 | t4 | t5 | t6 |
|---|---|---|---|---|---|---|---|---|---|
| (1) | IMAGING DEVICE | EXPOSURE | | | | | | | |
| | | OUTPUT | VIL1 | VIH1 | VIL2 | VIH2 | VIL3 | VIH3 | |
| (2) | | SWITCH a | W | W | W | W | W | W | |
| | | SWITCH c | W | W | W | W | W | W | |
| (3) | WRITE TO MEMORY | ADDRESS | AD1 | AD2 | AD3 | AD4 | AD1 | AD2 | |
| | | DATA | f2_L1 | f2_H1 | f2_L2 | f2_H2 | f2_L3 | f2_H3 | |
| (4a) | READ FROM MEMORY 1 | ADDRESS | | AD1e | AD1o | AD3e | AD3o | AD1e | |
| | | DATA | | f2_L1e | f2_L1o | f2_L2e | f2_L2o | f2_L3e | |
| (4b) | READ FROM MEMORY 2 | ADDRESS | | | AD2o | AD2e | AD4o | AD4e | |
| | | DATA | | | f2_H0o | f2_H1e | f2_H2o | f2_H2e | |
| (5) | | SWITCH d | | | W | W | W | W | |
| | | SWITCH b | | | W | W | W | W | |
| (6) | IMAGING APPARATUS OUTPUT | | | | WV11o | WV12e | WV22o | WV23e | |

FIG. 16

|  |  |  | t0 | t1 | t2 | t3 | t4 | t5 | t6 | TIME → |
|---|---|---|---|---|---|---|---|---|---|---|
| (1) | IMAGING DEVICE | EXPOSURE | ▨ | ▨ | ▨ | ▨ | ▨ | ▨ |  |  |
|  |  | OUTPUT |  | VIL1 | VIH1 | VIL2 | VIH2 | VIL3 | VIH3 |  |
| (2) |  | SWITCH a |  | w | w | w | w | w | w |  |
|  |  | SWITCH c |  | w | w | w | w | w | w |  |
| (3) | WRITE TO MEMORY | ADDRESS |  | AD1 | AD2 | AD3 | AD4 | AD1 | AD2 |  |
|  |  | DATA |  | f2_L1 | f2_H1 | f2_L2 | f2_H2 | f2_L3 | f2_H3 |  |
| (4a) | READ FROM MEMORY 1 | ADDRESS |  |  | AD1o | AD1e | AD3o | AD3e | AD1o |  |
|  |  | DATA |  |  | f2_L1o | f2_L1e | f2_L2o | f2_L2e | f2_L3o |  |
| (4b) | READ FROM MEMORY 2 | ADDRESS |  |  |  | AD2e | AD3o | AD4e | AD4o |  |
|  |  | DATA |  |  |  | f2_H1e | f2_H1o | f2_H2e | f2_H2o |  |
| (5) |  | SWITCH d |  |  |  | w | w | w | w |  |
|  |  | SWITCH b |  |  |  | w | w | w | w |  |
| (6) | IMAGING APPARATUS OUTPUT |  |  |  |  | WV11e | WV12o | WV22e | WV23o |  |

IMAGING APPARATUS, SIGNAL PROCESSING METHOD, AND PROGRAM

BACKGROUND

The present disclosure relates to an imaging apparatus, a signal processing method, and a program. More particularly, it relates to an imaging apparatus, a signal processing method, and a program, enabling generating of images with wide dynamic range and high quality, by image synthesizing processing using multiple images with different exposure times.

Solid-state imaging devices such as CCD (Charge-Coupled Device) image sensors and CMOS (Complementary Metal Oxide Semiconductor) image sensors, used with video cameras and digital still cameras and the like, accumulate charge corresponding to the amount of incident light, and perform photoelectric conversion in which an electric signal corresponding to the accumulated charge is output. However, there is an upper limit to the amount of charge accumulated in the photoelectric conversion device, and in the event of receiving light of a certain amount or greater the amount of charge accumulated reaches a saturation level, resulting in what is called "clipped whites" where subject regions of a certain brightness or more is set to a saturated luminance level.

In order to prevent such a phenomenon, processing is performed such as adjusting the exposure time by controlling the charge accumulation period at the photoelectric conversion device in accordance with change in external light and so forth, so as to control the sensitivity to an optimal value. For example, with regard to a bright subject, the shutter is released at high speed so as to reduce the exposure time, thereby shortening the charge accumulation period at the photoelectric conversion device, and outputting electric signals before the accumulated charge amount reaches the saturation level. Such processing enables output of an image in which gradient corresponding to the subject is accurately reproduced.

However, when imaging a subject including both bright and dark portions, releasing the shutter at high speed results in insufficient exposure time at dark portions, deteriorating the S/N (Signal-to-Noise) ratio and the image quality suffers. In order to accurately reproduce the luminance level of bright portions and dark portions in a shot image of a subject where there are both bright portions and dark portions, a high S/N (Source-to-Noise) ratio by a long exposure time has to be realized for pixels with little incident light on the image sensor, as well as processing to avoid saturation at pixels with greater light input.

There is related art which uses multiple images with different exposure times. This technique involves using a long-period exposure image for dark images, and uses a short-period exposure image for image regions where clipped whites would occur with a long exposure period, so as to determine and optimal pixel level. By synthesizing multiple different exposure images, an image with a wide dynamic range and no clipped whites, can be obtained.

For example, disclosed in Japanese Unexamined Patent Application Publication No. 2008-99158 and Japanese Unexamined Patent Application Publication No. 2008-227697 are configurations for synthesizing multiple images of different exposure amounts to obtain an image with a wide dynamic range.

FIG. 1 is a block diagram of an imaging apparatus 10 according to the related art which synthesizes images of two types of sensitivity obtained by switching the exposure time of an imaging device between long exposure and short exposure at each vertical period, and generates a wide dynamic range image.

Processing for generating the wide dynamic range image with the imaging apparatus 10 will be described. Light input through a lens 11 is subjected to photoelectric conversion at an imaging device 12, the output picture signals are subjected to correlated double sampling processing and AGC (Automatic Gain Control) at an analog front end 13, and then subjected to A/D (Analog-to-Digital) conversion to become a digital signal. Digital imaging signals output from an analog front end 13 are input to a signal processing unit 20.

At the signal processing unit 20, first, Y signals which are luminance signals, and R signals, G signals, and B signals, which are color signals, are generated by a YRGB generating circuit 21, YRGB also being called Luminance RGB. The Y signals, R signals, G signals, and B signals output from the YRGB generating circuit 21 are subjected to appropriate signal processing at a first signal processing unit 22, and then write processing to memory 23 is performed.

The memory 23 stores a low-sensitivity image and high-sensitivity image with different exposure time at the imaging device, i.e., a long exposure image and short exposure image. Thereafter, the long exposure image and short exposure image are read out from the memory 23 and input to an image synthesizing unit 24 (performing WDR (Wide Dynamic Range synthesizing)), where processing is performed to obtain a wide dynamic range by image synthesizing.

Subsequently, the synthesized image with wide dynamic range is input to an image correction unit 25 to perform γ correction processing and so forth, including processing for converting the YRGB signals into YCbCr signals including color difference signals for example, and further, final signal processing is performed at a second signal processing unit 26 and a final output image is generated.

Note that often, the first signal processing unit 22 performs frequency correction, signal level correction, WB (White Balance) correction, and so forth, the first signal processing unit 22 and the second signal processing unit 26 perform vertical inversion of the image, slow-shutter/still-shutter operations, hand movement compensation, electronic zoom and so forth, in conjunction with control of the memory 23, and the second signal processing unit 26 performs peak clipping, generating of color difference signals, OSD (On Screen Display), output encoding processing, and so forth.

With imaging apparatuses generating wide'dynamic range images by synthesizing processing of long exposure images and short exposure images, the rated value of the output signal level from the imaging apparatus 10 is the same between a normal image which has not been made a wide dynamic range image, and an image which has been made a wide dynamic range image. Accordingly, the contrast and brightness of the subject in the normal image which has not been made a wide dynamic range image and an image which has been made a wide dynamic range image will differ from each other depending on the state of the subject, and the image which has been made a wide dynamic range image is often not the desirable image, and accordingly, many arrangements enable both shooting of normal images not made a wide dynamic range image and images made a wide dynamic range image. Many arrangements are made such that whether or not to make a wide dynamic range image is selected in accordance with the state of the subject.

As shown in FIG. 1 here, the synthesizing processing by the image synthesizing unit 24 which performs processing for making a wide dynamic range image by synthesizing images has to be performed before the γ processing by the image correction unit 25. Accordingly, for example, with an imaging apparatus which generates Y, Cr, and Cb, 8 bits each, as output signals, according to the related art, write/read data to the memory is subjected to write/read in a data format called the 422 format with resolution of one pair of color signals to two pixels of luminance signals, at 10 bits or more each of luminance signals (Y) and color signals (G), (R), and (B), as shown in FIGS. 2A and 2B.

As shown in FIG. 2A, data read/write is performed in 422 format where the signals in increments of pixels are used for the luminance signal (Y), but an average value of two pixels is used for the color signals (G), (R), and (B). FIG. 2B illustrates an example of setting bits for each of the signals in a case of performing read/write with 10 bits of luminance signals (Y) and 12 bits of color signals (G), (R), and (B).

Note that for data read methods from the imaging device, the related art includes the progressive read method in which all pixels are read out as independent signals, and the interlaced read method in which the pixels of two vertically adjacent lines are mixed and read out.

The imaging device driving frequencies for the NTSC and PAL formats which are interlaced display formats are 13.5 MHz, 14 MHz, 18 MHz, and so forth, in the case of interlaced readout from the imaging device, while in the case of progressive readout, the double thereof which are 27 MHz, 28 MHz, and 36 MHz, are often used.

In the event that the read method from the imaging device is progressive read, two reads have to be performed for one write in order to perform synthesizing processing of two images to make a wide dynamic range, so in order to have one memory 23, the memory has to be operated at a frequency of at least three times the driving frequency of the imaging device, and in the case of progressive read, which is the double thereof which is 81 MHz, approximately 86 MHz, and 108 MHz.

In order to perform read/write of YRGB in the 422 format, 50÷2=25 bits of data are used per one clock, so either 32-bit data width memory has to be used, or the frequency further has to be doubled to 162 MHz, approximately 171 MHz, and 216 MHz, to use 16-bit memory. Four images have to be stored in order to obtain a wide dynamic range image with an imaging apparatus compatible with the NTSC or PAL formats, and while less than 64 MB is sufficient for the data size even when operating under progressive, 133 to 166 MHz is the maximum frequency for memory corresponding to 64 MB, so instead of using 133 MHz, the data width had to be 32 bits or high-speed memory had to be employed.

With the former, there have been the problems such as increased mounting area due to increased memory control lines or using two memory devices, becoming expensive due to having to use types of memory devices with little demand, and so forth. Also, there has been the problem of deterioration in image quality due to insufficient data resolution in the event of reducing the data format of the memory to 16 bits or lower, and particularly, this deterioration in image quality has been conspicuous in a case of not performing WDR synthesizing for making a wide dynamic range. Also, there has been the problem of error images occurring at the time of switching with imaging apparatus which operate by switching between the two types of data formats which are wide dynamic range images and normal images.

SUMMARY

It has been found desirable to provide an imaging apparatus, signal processing method, and program whereby, with an imaging apparatus capable of shooting the two types of images of an image which has been made a wide dynamic range image and a normal image, memory capacity can be reduced, occurrence of output error at the time of switching between the shooting modes of the two types of images of an image which has been made a wide dynamic range image and a normal image, can be prevented, and smooth mode switching is enabled.

One embodiment of the invention includes a signal processing unit for image signals including first, second, and third signal processing units, a memory storing image signals, and first, second, third, and fourth switches. The first switch is connected to an input of the second signal processing unit. The first switch switches between an output of the memory and an output of the first signal processing unit. The second switch is connected to an input of the third signal processing unit. The second switch switches between an output of the memory and an output of the second signal processing unit. The third switch is connected to the input of the memory. The third switch switches between the output from the second signal processing unit and the output from the first signal processing unit. The fourth switch is connected to the output of the memory. The fourth switch switches between the input to the third signal processing unit and the input to the second signal processing unit.

In another embodiment, the input/output paths of the memory are controlled. For normal image generation, image signals are stored into the memory and read from the memory, after image correction. For wide dynamic range image generation, image signals are stored into the memory and read from the memory before the image signals are corrected.

According to another embodiment, for normal image generation, the first switch is connected to the output of the first signal processing circuit. The second switch is connected to the output of the memory. The third switch is connected to the output of the second signal processing unit. The fourth switch is connected to the input to the third signal processing unit.

In another embodiment, for wide dynamic range image generation, the first switch is connected to the output of the memory. The second switch is connected to the output of the second signal processing unit. The third switch is connected to the output of the first signal processing unit. The fourth switch is connected to the input of the second signal processing unit.

According to still another embodiment, the second signal processing unit includes a synthesizing unit generating a wide dynamic range image from image signals stored in the memory. The synthesizing unit executes image synthesizing processing. For normal image generation, the image synthesizing processing is not executed.

In a further embodiment, the second signal processing unit includes an image synthesizing unit generating a wide dynamic range image from image signals stored in the memory and executing image synthesizing processing. The second signal processing unit also includes an image correction unit and a signal processing device. The image correction unit corrects image signals. The signal processing device converts image signals into color different signals. For normal image generation, the image synthesizing processing is not executed by the image synthesizing unit.

In another embodiment, an image processing unit switches processing between a normal image generation operation and a wide dynamic range image generation operation in response to control signals from a controller. The signal processing unit includes a memory, image correction unit and switching devices. The memory stores image signals. The image correction unit corrects the image signals. The switching devices are connected to the memory and the image correction unit and switch input/output paths of the memory to/from the image correction unit.

In a further embodiment, the input/output paths of the memory are controlled differently for normal image generation and wide dynamic range image generation. For normal image generation, the image signals are stored in the memory and read from the memory after image correction by the image correction unit. For wide dynamic range image generation, image signals are stored into the memory and are read from the memory before the image signals are corrected by the image correction unit.

In another embodiment, an image signal processing system includes a memory, a control unit, a signal processing unit, and switching unit. The signal processing unit includes an image correction unit and an image synthesizing unit. The memory stores image signals. The control unit executes signal path control of input/output paths of the memory. The image correction unit corrects the image signals. The image synthesizing unit generates a wide dynamic range image from the image signal stored in the memory and executes image synthesizing processing. The switching units are connected to the memory and signal processing unit and switch signal paths of the memory to/from the signal processing unit.

In a further embodiment, the image signal processing system controls the input/output paths of the memory for normal image generation and for wide dynamic range image generation. For normal image generation, image signals are stored into and read from the memory after image correction by the image correction unit. For wide dynamic range image generation, image signals are stored into the memory and read from the memory before the image signals are synthesized by the synthesizing unit and corrected by the image correction unit.

In an additional embodiment, for normal image generation, image synthesizing processing is not executed by the image synthesizing unit.

Further objects and advantages of the present invention will be apparent from the following description of the preferred embodiments of the invention as illustrated in the accompanying drawings.

BRIEF DESCRIPTION OF THE DRAWINGS

FIG. 1 is a diagram for describing a configuration example of an imaging apparatus which generates a wide dynamic range image by synthesizing images of two types of sensitivity;

FIG. 3 is a diagram for describing a configuration example of an imaging apparatus according to an embodiment;

FIG. 5 is a diagram for describing switch settings and processing when a wide dynamic range mode for generating wide dynamic range images is set, with an imaging apparatus according to an embodiment;

FIGS. 6A and 6B are diagrams for describing examples of the format of data stored in memory with an imaging apparatus according to an embodiment;

FIG. 8 is a diagram for describing a normal image generating sequence with progressive readout and progressive output, which an imaging apparatus according to an embodiment;

FIG. 9 is a diagram for describing a wide dynamic range image generating sequence (first example) with progressive readout and progressive output, which an imaging apparatus according to an embodiment;

FIG. 10 is a diagram for describing a wide dynamic range image generating sequence (second example) with progressive readout and progressive output, which an imaging apparatus according to an embodiment;

FIG. 13 is a diagram for describing a wide dynamic range image generating sequence (first example) with progressive readout and interlaced output, which an imaging apparatus according to an embodiment;

FIG. 14 is a diagram for describing a wide dynamic range image generating sequence (second example) with progressive readout and interlaced output, which an imaging apparatus according to an embodiment;

FIG. 15 is a diagram for describing a wide dynamic range image generating sequence (third example) with progressive readout and interlaced output, which an imaging apparatus according to an embodiment;

FIG. 16 is a diagram for describing a wide dynamic range image generating sequence (fourth example) with progressive readout and interlaced output, which an imaging apparatus according to an embodiment;

FIG. 17 is a diagram for describing a sequence for switching between generating of a normal image and generating of a wide dynamic range image with progressive readout and progressive output, which an imaging apparatus according to an embodiment;

FIG. 20 is a diagram for describing problems in a sequence for switching between generating of a normal image and generating of a wide dynamic range image.

DETAILED DESCRIPTION OF EMBODIMENTS

Figures 2A, 2B:
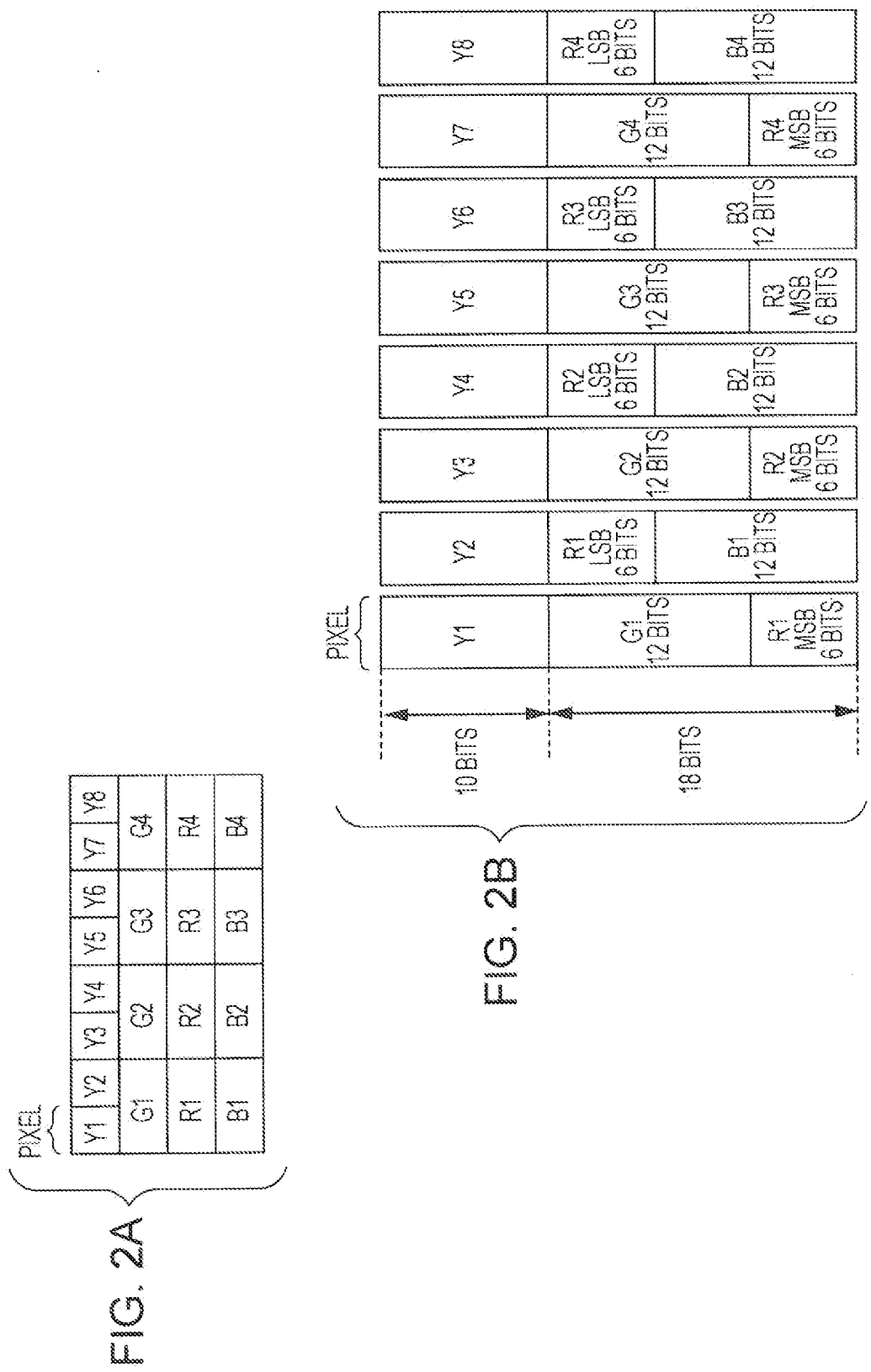
FIGS. 2A and 2B are diagrams for describing configuration examples of data stored in memory in an imaging apparatus.

An imaging apparatus, a signal processing method, and a program, according to the present disclosure, will be now described with reference to the drawings. Description will be made in order of the following items.
1. About Overall Configuration Example of Imaging Apparatus
2. About Settings for When Performing Normal Image Generating Processing and Wide Dynamic Range Image Generating Processing
3. About Format of Data Stored in Memory 4. About Detailed Sequence of Image Generating Processing
- (4-A) Normal Image Generating Sequence with Progressive Readout and Progressive Output
- (4-B) Wide Dynamic Range Image Generating Sequence with Progressive Readout and Progressive Output (First Example)
- (4-C) Wide Dynamic Range Image Generating Sequence with Progressive Readout and Progressive Output (Second Example)
- (4-D) Normal Image Generating Sequence with Progressive Readout and Interlaced Output (First Example)
- (4-E) Normal Image Generating Sequence with Progressive Readout and Interlaced Output (Second Example)
- (4-F) Wide Dynamic Range Image Generating Sequence with Progressive Readout and Interlaced Output (First Example)
- (4-G) Wide Dynamic Range Image Generating Sequence with Progressive Readout and Interlaced Output (Second Example)
- (4-H) Wide Dynamic Range Image Generating Sequence with Progressive Readout and Interlaced Output (Third Example)
- (4-I) Wide Dynamic Range Image Generating Sequence with Progressive Readout and Interlaced Output (Fourth Example)
- (4-J) Sequence for Switching Between Normal Image Generating and Wide Dynamic Range Image Generating with Progressive Readout and Progressive Output 1. About Overall Configuration Example of Imaging Apparatus FIG. 3 is a block diagram illustrating an embodiment of an imaging apparatus according to the present disclosure. While the disclosure will be described by way of an embodiment an imaging apparatus, it should be kept in mind that the disclose is not restricted to an imaging apparatus, and can be applied to other forms, including an image processing device which does not have an imaging portion for inputting imaged signals and performing signal processing.

The configuration and processing of an imaging apparatus 100 shown in FIG. 3 will be described. Light input through a lens 101 is subjected to photoelectric conversion at an imaging device 102. The electric signals corresponding to the image that have been generated at the imaging device 102 are subjected to correlated double sampling processing and AGC (Automatic Gain Control) at an analog front end 103 and then subjected to A/D (Analog-to-Digital) conversion to become digital signals corresponding to the image.

Further, the digital signals output from the analog front end 103 are input to a YRGB generating unit 121 of the signal processing unit 120, with Y signals which are luminance signals, and R signals, G signals, and B signals, which are color signals being generated at the YRGB generating unit 121.

The Y signals, R signals, G signals, and B signals output from the YRGB generating unit 121 are subjected to appropriate signal processing at a first signal processing unit 122, and then input to the N side input terminal of a switch a (denoted by reference numeral 151a; hereinafter also referred to as "switch 151a"), and the W side input terminal of a switch c (denoted by reference numeral 151c; hereinafter also referred to as "switch 151c").

The output of the switch 151a is input to an image synthesizing unit 123 and subjected to image synthesizing processing as appropriate, i.e., processing for making a wide dynamic range is executed by image synthesizing processing of a short exposure image and long exposure image. Note that when generating a normal image, the image synthesizing unit 123 does not execute image synthesizing processing, and the input from the first signal processing unit 122 having sufficient resolution for second signal processing to be executed at a second signal processing unit 125 is output to an image correction unit (γ correction) 124 without change.

Note that the first signal processing unit 122 outputs signals capable of generating data of a normal image (data following a format 1 (f1) in later-described FIGS. 6A and 6B) stored as to memory 130, e.g., signals of 10 bits each of YRGB.

The image correction unit (γ correction) 124 subjects each of the YRGB signals to γ correction processing and outputs the corrected image to the second signal processing unit 125.

The second signal processing unit 125 performs processing for, for example, converting into signals including color difference signals (YCbCr) and so forth, and outputs the processed image to the W side input terminal of a switch b (denoted by reference numeral 151b; hereinafter also referred to as "switch 151b"), and the N side input terminal of the switch 151c. The output of the switch 151b is input to a third signal processing unit 126 where final signal processing is performed, thereby generating and outputting imaging apparatus output signals.

The output of the switch 151c is write data to the memory 130, and the read data from the memory 130 is input to a switch d (denoted by reference numeral 151d; hereinafter also referred to as "switch 151d"). Signals output from the N side input terminal of the switch 151d is input to the N side input terminal of the switch 151b, and the signals output from the W side output terminal of the switch 151d are input to the W side input terminal of the switch 151a.

Note that with the first signal processing unit 122, frequency correction, signal level correction, WB (White Balance) correction, and so forth, are performed. Often, at the second signal processing unit 125, peak clipping, generating of color difference signals, correction, and so forth, and at the third signal processing unit 126, OSD (On Screen Display), output encoding processing, and so forth are performed, but the roles of these signal processing units may be changed as appropriate.

The imaging apparatus 100 shown in FIG. 3 has a configuration capable of selectively executing the following processing;
- (1) Normal image generating processing for generating on image frame output from the imaging device 102 as one output image, and
- (2) WDR (Wide Dynamic Range) image generating processing in which images of two types of sensitivity obtained by switching the exposure time of an imaging device 102 between long exposure and short exposure at each vertical period are synthesized to generate an image with wide dynamic range.

Subjects output with desirable brightness in normal image generating processing often are images which are dark and have low contrast when made into a wide dynamic range image. Accordingly, even video cameras which can make wide dynamic range images have subject conditions where making wide dynamic range images is better and subject conditions where normal images are better.

With the imaging apparatus 100 shown in FIG. 3, a control unit 105 detects user settings through an input unit 106 for example, and enables switching between the normal image generating operations and wide dynamic range image generating operations.

Alternatively, control may be effected such that for example, the control unit 105 analyzes the histogram of luminance signals of a high-sensitivity image obtained by long exposure for example, and in the event of determining that the percentage of the region of clipped whites is high, imaging is executed to perform imaging of a low-sensitivity image by short exposure. For example, in the event that the region of clipped blacks and clipped whites is small in the histogram when performing high-sensitivity imaging, determination is made that making a wide dynamic range image is undesirable, and the settings are switched to normal image shooting operations.

The control unit 105 performs access control as to the memory, such as control of addressing setting and access sequences, for example. Further, at the time of switching processing between the normal image generating operations and wide dynamic range image generating operations, the control unit 105 executes signal path control accompanying switchover of input/output paths to the memory 130 for example. Note that the control unit 105 executes various types of processing and control following a program stored in a storage portion within itself or an unshown storage unit.

An example of specific processing of switching processing between the normal image generating operations and wide dynamic range image generating operations, which is one control which the control unit 105 executes, is the following processing. At the time of normal image generating, where image synthesizing processing at the image synthesizing unit 123 is not performed, signal path control is executed to set signals following correction by the image correction unit 124 as signals for read/write to and from the memory 130, and at the time of wide dynamic range image generating where image synthesizing processing at the image synthesizing unit 123 is performed, signal path control is executed to set signals before correction by the image correction unit 124 as signals for read/write to and from the memory 130.

Thus, the imaging apparatus 100 is of a configuration to switch between a normal image generating mode and a wide dynamic range image generating mode, by user settings or by automatic control performed by the control unit 105. The control unit 105 performs control such that, in the event of the normal image generating mode, the switches 151a through 151d of the signal processing unit 120 are of an N side connection configuration, and in the event of a wide dynamic range image generating mode, the switches 151a through 151d of the signal processing unit 120 are of a W side connection configuration.

Also, in the event of the normal image generating mode, the control unit 105 performs control to stop image synthesizing processing at the image synthesizing unit 123, and output the input from the first signal processing unit 122 directly to the image correction unit 124.

In the event of the wide dynamic range image generating mode, image synthesizing processing at the image synthesizing unit 123 is executed. The image synthesizing unit 123 generates a wide dynamic range image by executing image synthesizing processing for setting valid pixel values of the low sensitivity image obtained by short exposure, in the clipped whites region of the high sensitivity image obtained by long exposure.

2. About Settings for When Performing Normal Image Generating Processing and Wide Dynamic Range Image Generating Processing With the configuration of the imaging apparatus 100 in FIG. 3, the settings of the switches 151a through 151d differ and also the flow of signals differ, between when performing normal operations for generating a normal image and when performing wide dynamic range operations for generating a wide dynamic range image.

Figure 4:
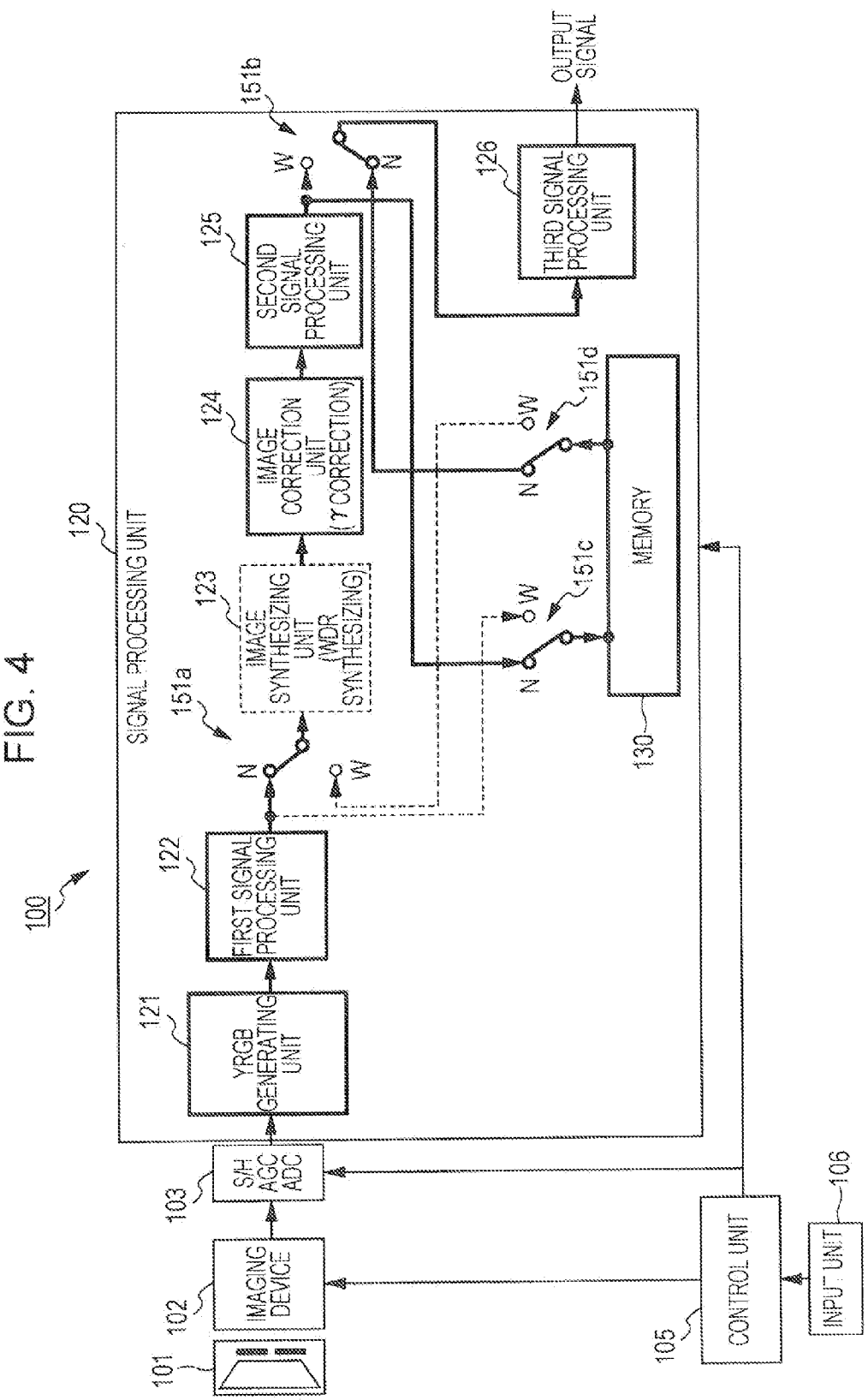
FIG. 4 is a diagram for describing switch settings and processing when a normal image mode for generating normal images is set, with an imaging apparatus according to an embodiment.

The difference in the flow of signals due to the difference in these modes will be described with reference to FIGS. 4 and 5. FIG. 4 is a diagram where the flow of signals when performing normal operations for generating a normal image is illustrated with heavy lines. FIG. 5 is a diagram where the flow of signals when performing wide dynamic range operations for generating a wide dynamic range image is illustrated with heavy lines.

First, the flow of signals when performing normal operations for generating a normal image will be described with reference to FIG. 4. At the time of performing normal operations for generating a normal image, the switches 151a through 151d are switched to the N side. After the input signals from the imaging device 102 are converted into digital signals via the analog front end 103, these are input to the YRGB generating unit 121 of the signal processing unit 120, and luminance signals Y and color signals R, G, B are generated.

The luminance signals Y and color signals R, G, B are subjected to signal processing at the first signal processing unit 122, and then input to the image synthesizing unit 123 via the switch 151a. When performing normal image generating operations, the image synthesizing unit 123 does not perform image synthesizing processing, and outputs the input signals to the image correction unit 124 without change.

The image correction unit 124 performs γ correction to each of the YRGB signals, and outputs the corrected signals to the second signal processing unit 125. At the second signal processing unit 125, for example conversion to signals including color difference signals (YCbCr) and so forth, peak clipping and other signal processing is performed, and the processed signals are written to the memory 130 via the switch 151c at the input portion of the memory 130.

Further, the read signals from the memory 130 are input to the third signal processing unit 126 via the switches 151d and 151b. The third signal processing unit 126 executes final signal processing as to the signals read out from the memory 130 and generates and outputs a normal image to be output from the imaging apparatus.

Next, the flow of signals when performing wide dynamic range operations for generating a wide dynamic range image will be described with reference to FIG. 5. When performing wide dynamic range operations for generating a wide dynamic range image, the switches 151a through 151d are switched to the W side.

The input signals from the imaging device 102 are converted into digital signals through the analog front end 103, and then input to the YRGB generating unit 121 of the signal processing unit 120, thereby generating luminance signals Y and color signals R, G, B.

The YRGB signals of which the luminance signals Y and color signals R, G, B, have been subjected to signal processing at the first signal processing unit 122, are temporarily stored in the memory 130 before performing subsequent signal processing. Writing to the memory 130 is performed via the switch 151c at the input portion of the memory 130.

As described earlier, the image synthesizing processing for generating a wide dynamic range image uses two images of a long exposure image and a short exposure image. Accordingly, the processing of shooting an image with the imaging device 102 through storage of the image in the memory 130 which has been described so far is performed as processing performed on the two consecutively-shot images of (a) and (b) which are (a) short exposure image (low-sensitivity image: Ln) and
(b) long exposure image (high-sensitivity image: Hn).

Note that specific processing sequences will be described later on in detail.

The two images stored in the memory 130 are subjected to readout from the memory 130 via the switch 151*d* at the output portion of the memory 130, and input to the image synthesizing unit 123 via the switch 151*a*. Reading processing of the images from the memory 130 is executed as processing for reading in parallel using the memory storage addresses of each of the two images of (a) short exposure image (low-sensitivity image: Ln) and (b) long exposure image (high-sensitivity image: Hn).

The image synthesizing unit 123 synthesizes the short exposure image and long exposure image read from the memory 130, and generates a wide dynamic range image. The generated wide dynamic range image is output to the image correction unit 124.

The image correction unit 124 performs γ correction on each of the YRGB signals, and outputs the corrected signals to the second signal processing unit 125. The second signal processing unit 125 performs, for example, conversion processing to signals including color difference signals (YCbCr) and so forth, and peak clipping and other signal processing, and the processed signals are input to the third signal processing unit 126 via the switch 151*b*. The third signal processing unit 126 executes final signal processing as to the signals read out from the memory 130 and generates a wide dynamic range image to be output from the imaging apparatus.

One major difference between the normal image generating processing described with reference to FIG. 4 and the wide dynamic range image generating processing described with reference to FIG. 5 is in the following memory read and writing timing.

With the normal image generating processing described with reference to FIG. 4, writing to and reading from the memory 130 is performed after the image correction (γ correction) at the image correction unit 124 and signal processing at the second signal processing unit 125. Subsequently, the signals read from the memory 130 are subjected to final signal processing at the second signal processing unit 125, and the normal image is output.

On the other hand, with the wide dynamic range image generating processing described with reference to FIG. 5, image synthesizing processing at the image synthesizing unit 123, image correction (γ correction) at the image correction unit 124, and write/read processing as to the memory 130 before signal processing at the second signal processing unit 125, are performed.

Subsequently, the signals read from the memory 130 are subjected to image synthesizing processing at the image synthesizing unit 123, image correction (γ correction) at the image correction unit 124, signal processing at the second signal processing unit 125, and further final signal processing is executed at the second signal processing unit 125, and the wide dynamic range image is output.

Note that with the wide dynamic range image generating processing, writing to the memory 130 is performed such that the two images of (a) short exposure image (low-sensitivity image: Ln) and (b) long exposure image (high-sensitivity image: Hn)

are sequentially written to individual memory address specified positions, and at the time of reading, these are read in parallel using the two memory addresses.

Note that with normal image generating processing described with reference to FIG. 4, following image correction (γ correction) at the image correction unit 124, signals, specifically YCbCr signals for example, are written to the memory 130, and also read therefrom.

On the other hand, with wide dynamic range image generating processing, writing to and reading from the memory 130 is performed before the following image correction (γ correction) at the image correction unit 124. That is to say, YRGB signals, which are the output of the first signal processing unit 122, are written and read.

Note that when performing wide dynamic range image generating described with reference to FIG. 5, the signal values of each of YRGB of each of the two images of (a) short exposure image (low-sensitivity image: Ln) and (b) long exposure image (high-sensitivity image: Hn) are stored in the memory 130.

3. About Format of Data Stored in Memory

As described above, with the normal image generating processing described with reference to FIG. 4, the YCbCr signals which are the results of image correction (γ correction) at the image correction unit 124 and signal processing at the second signal processing unit 125 are written to the memory 130, and also read therefrom. Configuration examples of data stored in the memory are shown as (1a) and (1b) in FIGS. 6A and 6B.

Data storage is performed as to the memory 130 in a data format (hereinafter referred to as data format 1 (f1)), of signals in the so-called 422 format with resolution of one pair of color difference signals (Cbn, Crn) for two pixels of luminance signals (Yn), as shown in (1a) in FIG. 6A, or in the so-called 411 format data format with the resolution of one pair of color signals as to four pixels of luminance signals with 8 bits of luminance signals (Y) and 8 bits of color signals (Cr=R−Y, Cb=B−Y), the same as the output signals as shown as (1b) in FIG. 6B.

Note that the two Cb1 shown in (1b) in FIG. 6B mean the same 8-bit data (e.g., the average of two pixels). The two Cr1 are also 8-bit data of the same Cr1. On the other hand, at the time of generating the wide dynamic range image described with reference to FIG. 5, the output signals of the first signal processing unit 122 are stored in the memory 130.

Figure 7:
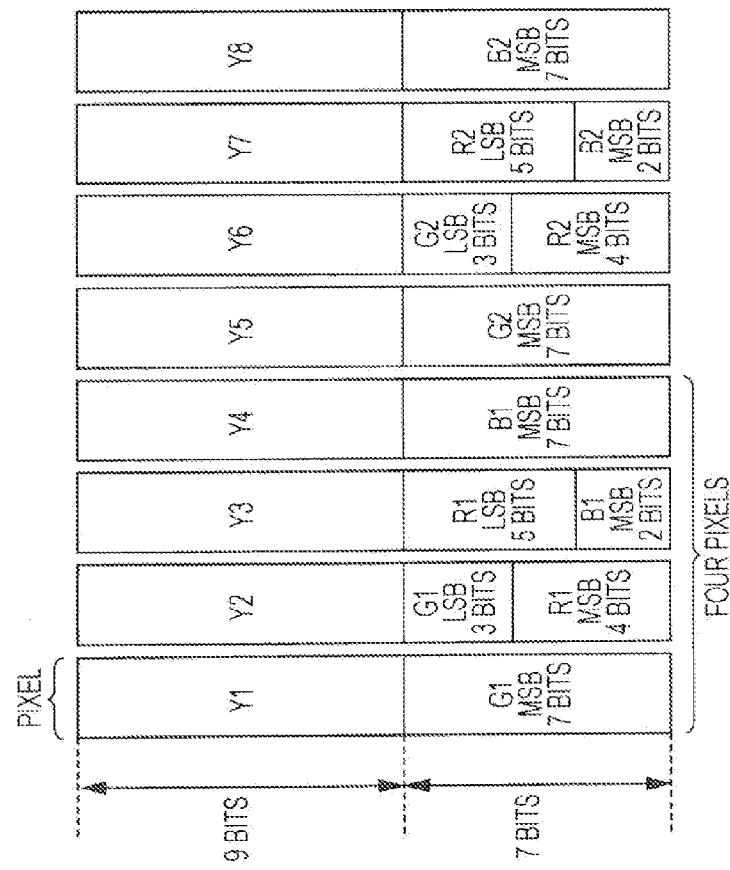
FIG. 7 is a diagram for describing an example of the format of data stored in memory with an imaging apparatus according to an embodiment.

A configuration example of the data stored in memory at this time is shown as (2) in FIG. 7. As shown in (2) in FIG. 7, data is written to and read from the memory 130 in a data format (hereinafter referred to as data format 2 (f2)), in the so-called 411 format data format with the resolution of one pair of color signals as to four pixels of luminance signals with 9 bits of luminance signals (Y) and 10 bits of color signals (G) and 9 bits each of color signals (R) and of (B).

As described above, the control unit 105 performs signal path control such that when performing normal image generating where no image synthesizing processing is performed at the image synthesizing unit 123, signals following correction at the image correction unit 124 are set as signals to be written to and read from the memory 130, and when performing wide dynamic range image generating where image synthesizing processing is performed at the image synthesizing unit 123, signals before correction at the image correction unit 124 are set as signals to be written to and read from the memory 130.

The second signal processing unit 125 outputs signals following the format (f1) shown in FIGS. 6A and 6B having a ratio of two each of color difference signals (Cb, Cr) as to four of luminance (Y), or having a ratio of one each of color difference signals (Cb, Cr) as to four of luminance (Y), with the settings of 8 bits of luminance signals (Y) and 8 bits each of (Cb), (Cr), with regard to color difference signals (Cb, Cr), and at the time of normal image generating where no image synthesizing processing is performed at the image synthesizing unit 123, the control unit 105 performs signal path control such that signals following the format (f1) shown in FIGS. 6A and 6B are set as signals to be written to and read from the memory 130.

The first signal processing unit 122 outputs signals following the format (f2) shown in FIG. 7 having a ratio of one each of color signals (R, G, B) as to four of luminance (Y), with the settings of 9 bits of luminance signals (Y) and 10 bits of (G) and 9 bits each of (R) and (B), with regard to color signals (R, G, B), and at the time of wide dynamic range image generating where image synthesizing processing is performed at the image synthesizing unit 123, the control unit 105 performs signal path control such that signals following the format (f2) are set as signals to be written to and read from the memory 130.

4. About Detailed Sequence of Image Generating Processing

As described with reference to FIGS. 3 through 5, the imaging apparatus according to the present disclosure generates different images in the two modes of a normal image generating processing mode, executed in the normal image mode described with reference to FIG. 4, and a wide dynamic range image generating processing executed in the wide dynamic range mode described with reference to FIG. 5.

The imaging apparatus according to the present disclosure performs processing in which the data storage as to the memory 130 is changed or the memory write and read timing is made to differ, for these different image generating processing. In the following, description will be made regarding the details of various image generating processing sequences which the imaging apparatus according to the present disclosure performs.

Note that, as forms of pixel readout from the imaging device; there is progressive readout where the pixel values of the pixels making up an image are read out with a single scan, and interlaced readout where an even line scan and an odd line scan are independently executed to read out. Also, for the forms of output from the imaging apparatus which is output as to a display device, there is progressive output where the pixel values of the pixels making up an image are output with a single scan, and interlaced output where an even line scan and an odd line scan are independently executed to output.

In the following, details of specific image generating processing sequences corresponding to various combinations of these readout and output forms will be individually described. Each of the following processing will be described in sequence.

Figure 17:
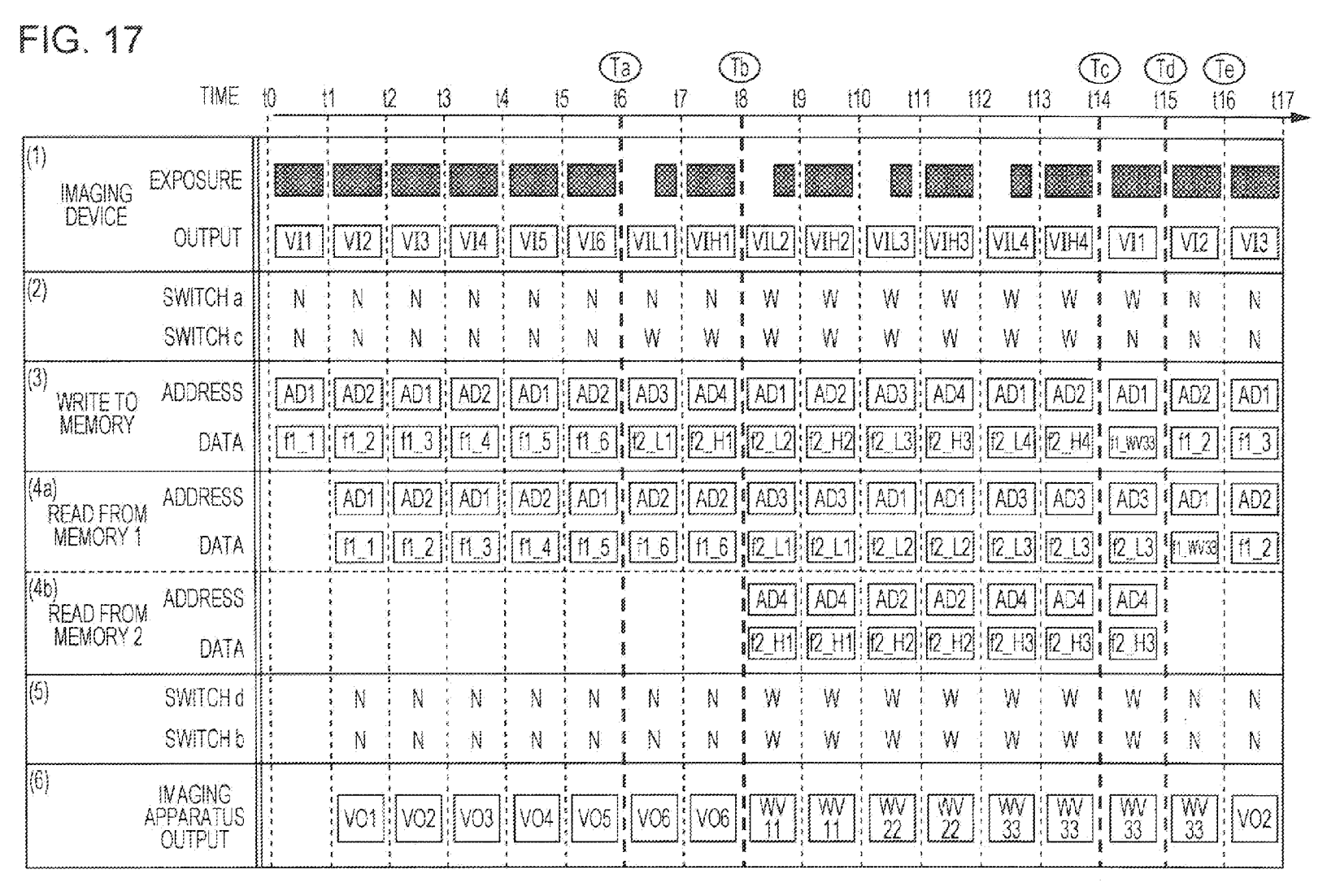

(4-A) Normal Image Generating Sequence with Progressive Readout and Progressive Output (FIG. 8)
(4-B) Wide Dynamic Range Image Generating Sequence with Progressive Readout and Progressive Output (First Example) (FIG. 9)
(4-C) Wide Dynamic Range Image Generating Sequence with Progressive Readout and Progressive Output (Second Example) (FIG. 10)
(4-D) Normal Image Generating Sequence with Progressive Readout and Interlaced Output (First Example) (FIG. 11)
(4-E) Normal Image Generating Sequence with Progressive Readout and Interlaced Output (Second Example) (FIG. 12)
(4-F) Wide Dynamic Range Image Generating Sequence with Progressive Readout and Interlaced Output (First Example) (FIG. 13)
(4-G) Wide Dynamic Range Image Generating Sequence with Progressive Readout and Interlaced Output (Second Example) (FIG. 14)
(4-H) Wide Dynamic Range Image Generating Sequence with Progressive Readout and Interlaced Output (Third Example) (FIG. 15)
(4-I) Wide Dynamic Range Image Generating Sequence with Progressive Readout and Interlaced Output (Fourth Example) (FIG. 16)
(4-J) Sequence for Switching Between Normal Image Generating and Wide Dynamic Range Image Generating with Progressive Readout and Progressive Output (FIG. 17)

(4-A) Normal Image Generating Sequence with Progressive Readout and Progressive Output First, description will be made regarding the details of a normal image generating sequence with progressive readout and progressive output, with reference to FIG. 8. FIG. 8 is a diagram illustrating a detailed sequence at the time of performing normal operations (see FIG. 4) for generating a normal image with the imaging apparatus according to the present disclosure, by operating the imaging device with progressive readout and progressive operation of the imaging apparatus output.

The elapsed time (time t0 to t6) is shown from left to right, and the following data and settings are shown at each of these times.

(1) exposure and output of imaging device 102
(2) settings of switches 151a and 151c
(3) write address to memory 130 and write data
(4) read address from memory 130 and read data
(5) settings of switches 151d and 151b
(6) output of imaging apparatus 100

The time intervals of t0 to t1, t1 to t2, and so on, are equivalent to the vertical cycle which is the signal read cycle from the imaging device 102. As shown in (1) in FIG. 8, the imaging device 102 outputs (VI1), (VI2), (VI3), (VI4), and so on as imaging device output as the results of being exposed at each of the vertical cycles (t0 to t1, t1 to t2, and so on). The numerical values 1, 2, and so on are identification Nos. indicating the order of output from the imaging device.

As shown in (2) in FIG. 8, the settings of switches 151a and 151c are all set to the terminal N side in the normal image generating mode, as described with reference to FIG. 4 above. Note that these settings are performed by the control unit 105.

The processing results of the second signal processing unit 125 are stored in the memory 130 following these switch settings. As shown in (3) in FIG. 8, two memory addresses AD1 and AD2 are alternately used to sequentially store the data (f1_1), (f1_2), (f1_3) and so on, as the processing results of the second signal processing unit 125. Note that f1 means that storage in memory will be performed following memory storage format 1.

The format 1 (f1) corresponds to the format described earlier with reference to FIGS. 6A and 6B, and stores YCbCr signals which are the processing of the second signal processing unit 125 in the first format of FIG. 6A or 6B.

In the normal image generating mode, the YCbCr signals output as the processing results of the third signal processing unit 126 are recorded in the memory 130 in the first format (f1) shown in FIG. 6A or 6B. That is to say, written to the memory 130 are signals in the so-called 422 format with resolution of one pair of color difference signals (Cbn, Crn) for two pixels of luminance signals (Yn), as shown in FIG. 6A, or signals in the so-called 411 format with the resolution of one pair of color signals as to four pixels of luminance signals with 8 bits of luminance signals (Y) and 8 bits of color difference signals (Cr, Cb), as shown in FIG. 6B.

Note that the data serving as the processing results of the second signal processing unit 125 for the imaging device output (VI1) shown in (1) in FIG. 8 corresponds to the data (f1_1) stored in the memory shown in (3) in FIG. 8. The processing from output from the imaging device 102 to storage in the memory 130 is performed in the period of time t0 to t1.

What is performed in this time t0 to t1 is the processing up to storing the data (f1_1) at the position specified by the memory address AD1 in the format 1 (f1).

In the next time t1 to t2, with the processing of "(1) imaging device" up to "(3) write to memory", the same processing as the processing as to the imaging device output (VI1) in time t0 to t1 is performed on the next imaging device output (VI2). Note however, that data (f1_2) is written to a memory position of an address AD2 different from the address to which the memory has been stored in time t0 to t1.

In this time t1 to t2, further, processing in FIG. 8 from "(4) read from memory" through "(6) imaging apparatus output" is also performed. This is processing as to the data (f1_1) written to the memory in time t0 to t1.

As shown in the space in "(4) read from memory" in FIG. 8, the data (f1_1) is read out from the address AD1 position. The switch settings in (5) in FIG. 8 illustrate the setting state of switches 151d and 151b. As described with reference to FIG. 4, in the normal image generating processing mode, the switches 151d and 151b are both set to N side connection.

The data (f1_1) read out from the memory 130 following these switch settings is supplied to the third signal processing unit 126, subjected to final signal processing, and output as output (V01) as a normal image.

With the normal image generating sequence with progressive read and progressive output shown in FIG. 8, two addresses AD1 and AD2 are used to alternately write data with the data format 1 (f1). Data readout is performed along with the data write processing, using addresses other than the addresses applied to the write processing.

After time t1, data input from the imaging device is written using one of the addresses AD1 and AD2 in this way, and readout of data written in advance to the memory is performed using the other thereof.

This processing is repeated, and executed, thereby outputting the imaging apparatus outputs VO1, VO2, VO3, VO4 and so on of a normal image.

(4-B) Wide Dynamic Range Image Generating Sequence with Progressive Readout and Progressive Output (First Example)

Next, the details of a wide dynamic range image generating sequence with progressive readout and progressive output will be described with reference to FIG. 9. FIG. 9 is a diagram illustrating a detailed sequence at the time of performing wide dynamic range operations (see FIG. 5) for generating a wide dynamic range image with the imaging apparatus according to the present disclosure, by operating the imaging device with progressive readout and progressive operation of the imaging apparatus output.

The elapsed time (time t0 to t6) is shown from left to right, and the following data and settings are shown at each of these times.

(1) exposure and output of imaging device 102
(2) settings of switches 151a and 151c
(3) write address to memory 130 and write data
(4a) read address from memory 130 and read data
(4b) read address from memory 130 and read data
(5) settings of switches 151d and 151b
(6) output of imaging apparatus 100

With this example, data readout from the memory 130 is executed as readout processing of two sets of image data of a long exposure image (high sensitivity image (Hn)) and short exposure image (low sensitivity image (Ln)) to be applied to image synthesizing processing performed at the image synthesizing unit 123. This parallel readout processing corresponds to the processing of (4a) and (4b).

The time intervals of t0 to t1, t1 to t2, and so on, are equivalent to the vertical cycle which is the signal read cycle from the imaging device 102. As shown in (1) in FIG. 9, the imaging device 102 outputs (VIL1), (VIH1), (VIL2), (VIH2), and so on as imaging device output as the results of being exposed at each of the vertical cycles (t0 to t1, t1 to t2, and so on). Note that L means the short exposure image (low sensitivity image) and H the long exposure image (high sensitivity image). The numerical values 1, 2, and so on are identification Nos. indicating the order of output from the imaging device.

As shown in (2) in FIG. 9, the settings of switches 151a and 151c are all set to the terminal W side in the wide dynamic range image generating mode, as described with reference to FIG. 5 above. Note that these settings are performed by the control unit 105.

The processing results of the first signal processing unit 122 are stored in the memory 130 following these switch settings. As shown in (3) in FIG. 9, four memory addresses AD1, AD2, AD3, and AD4 are repeatedly used in order to sequentially store the data (f2_L1), (f2_H1), (f2_L2), (f2_H2), and so on, as the processing results of the first signal processing unit 122. That is to say, the short exposure image (low sensitivity image (Ln)) and long exposure image (high sensitivity image (Hn)) are sequentially stored.

Note that f2 means that storage in memory will be performed following memory storage format 2. The format 2 (f2) corresponds to the format described earlier with reference to (2) in FIG. 7, and stores YRGB signals which are the processing results of the first signal processing unit 122 in the second format of (2) in FIG. 7.

In the wide dynamic range image generating mode, the YRGB signals output as the processing results of the first signal processing unit 122 are recorded in the memory 130 in the format shown in (2) in FIG. 7. That is to say, data written to the memory 130 are signals in the so-called 411 format (second format (f2)) data format with resolution of one pair of color signals for four pixels of luminance signals, with 9 bits of luminance signals (Y), and 10 bits of color signals (G) and 9 bits of color signals (R) and 9 bits of (B).

Note that the data serving as the processing results of the first signal processing unit 122 for the imaging device output (VIL1) shown in (1) in FIG. 9 corresponds to the data (f2_L1) stored in the memory shown in (3) in FIG. 9. The processing from output from the imaging device 102 to storage in the memory 130 is performed in the period of time t0 to t1.

What is performed in this time t0 to t1 is the processing up to storing the data (f2_L1) at the position specified by the memory address AD1 in the format 2 (f2).

In the next time t1 to t2, with the processing of "(1) imaging device" up to "(3) write to memory", the same processing as the processing as to the imaging device output (VIL1) in time t0 to t1 is performed on the next imaging device output (VIH1). Note that the imaging device output (VIL1) and imaging device output (VIH1) in time t0 to t1 are the two images to be subjected to image synthesizing processing for generating a wide dynamic range image.

In FIG. 9 "(3) write to memory", data (f2_H1) is written to a memory position of an address AD2 different from the address AD1 to which the memory has been stored in time t0 to t1.

In the next time t2 to t3, with the processing of "(1) imaging device" up to "(3) write to memory", the same processing as the processing as to the imaging device output (VIL1) in time t0 to t1 is performed on the next imaging device output (VIL2). With "(3) write to memory" in FIG. 9, data (f2_L2) is written to a memory position of an address AD3 different from the address AD1 to which the memory has been stored in time t0 to t1, and the address AD2 to which the memory has been stored in time t1 to t2.

Further, in the next time t2 to t3, processing from "(4) read from memory" through "(6) imaging apparatus output" in FIG. 9 is also performed. This is processing as to the data (f2_L1) written to the memory in time t0 to t1 and the data (f2_H1) written to the memory in time t1 to t2.

As shown in the space in "(4a) read from memory" in FIG. 9, the data (f2_L1) is read out from the address AD1 position. Further, as shown in the space of "(4b) read from memory" in FIG. 9, the data (f2_H1) is read out from the address AD2 position.

Note however, that readout of the data (f2_L1) and the data (f2_H1) is not restricted to this time t2 to t3, and that the same data readout is executed in the following time t3 to t4 as well.

As shown in the spaces in FIG. 9 for t2 to t3, and t3 to t4, the two data for generating the synthesized image, i.e., the readout of the data (f2_L1) from the address AD1 and the readout of the data (f2_H1) from the address AD2 is performed using the write time of data (f2_L2) to memory (address AD3) in time t2 to t3, and the write time of data (f2_H2) to memory (address AD4) in time t3 to t4.

That is to say, in conjunctions with the write processing time of the two images to generate the synthesized image, read of the two images to generate the synthesized image written to memory in advance is executed.

The switch settings in (5) in FIG. 9 illustrate the setting state of switches 151d and 151b. As described with reference to FIG. 5, in the wide dynamic range image generating processing mode, the switches 151d and 151b are both set to W side connection.

The short exposure image data (low sensitivity image (f2_L1)), and long exposure image data (high sensitivity image (f2_H1)) read out from the memory 130 following these switch settings are output to the image synthesizing unit 123. The image synthesizing unit 123 performs image synthesizing processing using these two images, and generates a wide dynamic range image.

Thereafter, the generated wide dynamic range image is output to the image correction unit 124. The image correction unit 124 performs γ correction and outputs the corrected signals to the second signal processing unit 125. At the second signal processing unit 125, the YRGB signals are converted to YCbCr signals for example, and the converted signals are input to the third signal processing unit 126 via switch 151b.

The third signal processing unit 126 executes final signal processing on the readout signal from the memory 130, and generates and outputs a wide dynamic range image to be output from the imaging apparatus. The final output is equivalent to "(6) imaging apparatus output" in FIG. 9 (WV11).

With the wide dynamic range image generating sequence with progressive read and progressive output shown in FIG. 9, the four memory addresses AD1, AD2, AD3, and AD4 are sequentially used with data format 2 (f2), and the image pairs of short exposure image data (low sensitivity image (f2_Ln)) and long exposure image data (high sensitivity image (f2_Hn)), and further, the next short exposure image data (low sensitivity image (f2_Ln+1)) and long exposure image data (high sensitivity image (f2_Hn+1)), are sequentially written to different positions in the memory.

As shown as the processing of time t2 and on, readout is executed to the two image data for generating the synthesized image, using two addresses other than the address applied for writing processing in conjunction with the data write processing.

From time t2 on, write of data input from the imaging device is performed using one of the addresses AD1 through AD4, and readout of two image data for generating the synthesized image, written to memory in advance using either set of addresses AD1 and AD2 or AD3 and AD4, is executed. This processing is repeatedly executed, so as to output the imaging apparatus output WV11, WV11, WV22, WV22 and so on, of the wide dynamic range image.

Note that WV means a wide dynamic range image, and as for the sequence of values thereafter, the first numerical value is an identification No. of the long exposure image (high sensitivity image (H)) and the later numerical value is an identification No. of the short exposure image (low sensitivity image (L)).

For example, the output WV11 in time t2 to t3 is a wide dynamic range image generated by synthesizing processing of the long exposure image (high sensitivity image (H)) (f2_H1) and the short exposure image (low sensitivity image (L)) (f2_L1) read out from the memory. The output WV11 of the time t3 to t4 is also the same output.

The output WV22 in time t4 to t5 is a wide dynamic range image generated by synthesizing processing of the long exposure image (high sensitivity image (H)) (f2_H2) and the short exposure image (low sensitivity image (L)) (f2_L2) read out from the memory.

Note that in this processing example, the output image between the two consecutive times t2 to t3 and t3 to t4 is the same wide dynamic range image, and the output image between the next two times t4 to t5 and t5 to t6 is also the same wide dynamic range image. That is to say, the output rate is lower than the output rate of a normal image described earlier with reference to FIG. 8.

(4-C) Wide Dynamic Range Image Generating Sequence with Progressive Readout and Progressive Output (Second Example)

Next, another example of a wide dynamic range image generating sequence with progressive readout and progressive output will be described with reference to FIG. 10. The processing example shown in FIG. 10 is a wide dynamic range image generating sequence in with progressive readout and progressive output, in the same way as with the processing example in FIG. 9. Note however, the processing shown in FIG. 10 differs with regard to the point that the pair of images to be read out from the memory 130 to generate a wide dynamic range image is constantly set to the newest image.

For example, with the sequence shown in FIG. 9, in time t2 to t3, readout of the data (f2_L1) from the address AD1, and readout of the data (f2_H1) from the address AD2, is executed, and further, in time t3 to t4, readout of the data (f2_L1) from the address AD1, and readout of the data (f2_H1) from the address AD2, is executed.

On the other hand, with the sequence shown in FIG. 10, in time t1 to t2 where no readout was being performed in FIG. 9, readout of the data (f2_L1) from the address AD1 is started, and further, in time t2 to t3, readout of the data (f2_L1) from the address AD1 and readout of the data (f2_H1) from the address AD2 is executed, and in the next time t3, t0 t4, readout of the data (f2_L2) from the address AD3, and readout of the data (f2_H1) from the address AD2, is executed.

That is to say, this processing example shown in FIG. 10 differs with regard to the point that readout of the data (f2_L2) from the address AD3 is performed in time t2 to t3. This data (f2_L2) is data that has been written to the memory 130 in the immediately-preceding time t2 to t3. This processing example is a sequence for generating a wide dynamic range image as a synthesized image using the combination of newest data of the data stored in the memory 130.

In the sequence shown in FIG. 10, the processing of "(1) imaging device" through "(3) write to memory" is the same as with FIG. 9. The processing of (4a) and (4b) "read from memory" differs with regard to the point that the newest data of the data stored in the memory, i.e., the data written to the memory 130 with the latest timing, is read, as described above.

The "(5) switch settings" are the same as with the sequence in FIG. 9, set so as to be connected to the W side as described with reference to FIG. 5 earlier. The "(6) imaging apparatus output" is an image different from the output in the sequence described with reference to FIG. 9. That is to say, the combination of images to be applied for generating a wide dynamic range image differs.

As shown in "(6) imaging apparatus output" FIG. 10, the settings are such that the output of time t2 to t3 is WV11, the output of time t3 to t4 is WV12, the output of time t4 to t5 is WV22, and the output of time t5 to t6 is WV23. Note that WV means a wide dynamic range image, and as for the sequence of values thereafter, the first numerical value is an identification No. of the long exposure image (high sensitivity image (H)) and the later numerical value is an identification No. of the short exposure image (low sensitivity image (L)).

For example, the output WV11 in time t2 to t3 is a wide dynamic range image generated by synthesizing processing of the long exposure image (high sensitivity image (H)) (f2_H1) and the short exposure image (low sensitivity image (L)) (f2_L1) read out from the memory. The output WV12 in time t3 to t4 is a wide dynamic range image generated by synthesizing processing of the long exposure image (high sensitivity image (H)) (f2_H1) and the short exposure image (low sensitivity image (L)) (f2_L2) read out from the memory.

Thus, this processing example is a processing example of obtaining the newest-usable images stored in memory and performing synthesizing processing to generate a wide dynamic range, image. In this way, with the processing example shown in FIG. 10, writing is sequentially performed of the output of the first signal processing unit 122 in data format 2 (f2) using the four addresses AD1 through AD4 of the memory 130. With regard to reading of data from the memory, the newest of each of the high sensitivity data and low sensitivity data is read.

The image synthesizing unit 123 generates video signals made wide dynamic range, using the pair of newest images, and outputs as imaging apparatus output WV11, WV12, WV22, WV23, WV33, WV34, and so on. Thus, this processing example allows combinations of a low sensitivity image and high sensitivity image to be applied to processing for making wide dynamic range, to be generated based on newer shot images.

(4-D) Normal Image Generating Sequence with Progressive Readout and Interlaced Output (First Example)

Figure 11:
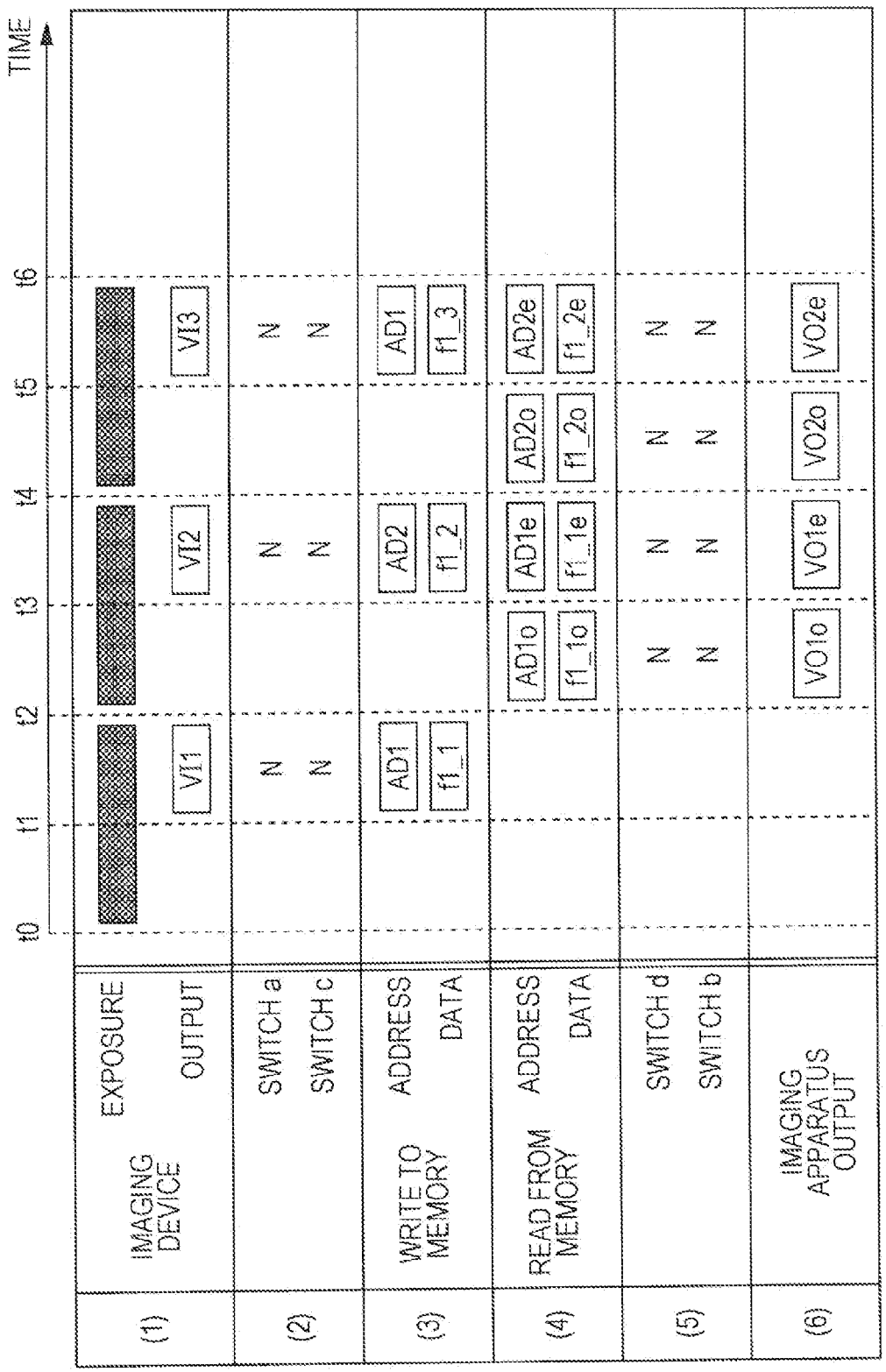
FIG. 11 is a diagram for describing a normal image generating sequence (first example) with progressive readout and interlaced output, which an imaging apparatus according to an embodiment.

Next, the details of a normal image generating sequence with progressive readout and interlaced output will be described with reference to FIG. 11. FIG. 11 is a diagram illustrating a detailed sequence at the time of performing normal operations (see FIG. 4) for generating a normal image with the imaging apparatus according to the present disclosure, by operating the imaging device with progressive readout and interlaced operation of the imaging apparatus output.

The elapsed time (time t0 to t6) is shown from left to right, and the following data and settings are shown at each of these times.

(1) exposure and output of imaging device 102
(2) settings of switches 151a and 151c
(3) write address to memory 130 and write data
(4) read address from memory 130 and read data
(5) settings of switches 151d and 151b
(6) output of imaging apparatus 100

The time intervals of t0 to t1, t1 to t2, and so on, are equivalent to the vertical cycle which is the signal read cycle from the imaging device 102.

As shown in "(4) read from memory space" in FIG. 11, with interlaced output, the odd line output of the imaging device and the even line output of the imaging device are read each vertical cycle. Note that the memory readout data (f1_1o) in time t2 to t3 for example, means that the data stored in the memory is of the first odd field (o) in format 1 (f1). Here, "o" is data of an odd numbered field, and "e" is data of an even numbered field.

With interlaced output, the imaging apparatus output shown in (6) is output in the order of odd and even field output VO1o, Vo1e, VO2o, Vo2e, VO3o, Vo3e, and so on, by reading the odd numbered line output of the imaging device and the even numbered line output of the imaging device each vertical cycle. That is to say, interlaced output is realized. Due to this output, by synthesizing the output signals in the combination of odd+even, an image with no interlacing blurring can be obtained.

As shown in (1) in FIG. 11, the imaging device 102 outputs (V11), (V12), (V13), and so on as imaging device output as the results of being exposed at double each of the vertical cycle periods (t0 to t2, t2 to t4, and so on).

As shown in (2) in FIG. 11, the settings of switches 151a and 151c are all set to the terminal N side in the normal image generating mode, as described with reference to FIG. 4. Note that these settings are performed by the control unit 105.

As shown in (3) in FIG. 11, two memory addresses AD1 and AD2 are alternately used in order to sequentially store the data (f1_1), (f1_2), (f1_3) and so on, as the processing results of the second signal processing unit 125. Note that f1 means stored in the memory following format 1 described with reference to FIGS. 6A and 6B. Data (f1_1) is stored in memory address AD1 by time t2. Data (f1_2) is stored in memory address AD2 by time t4. Data (f1_3) is stored in memory address AD1 by time t6.

In the period following time t2, further, processing from "(4) read from memory" through "(6) imaging apparatus output" in FIG. 11 is also performed. These processing are processing as to the data written to the memory.

In time t2 to t3, as shown in the space in "(4) read from memory" in FIG. 11, the data (f1_1o) is read out from the address AD1o position. Note that address AD1o is a data read address corresponding to the odd field, configuring a part of the address AD1.

Address ADn has a configuration which can be separated into the data read address ADno corresponding to the odd field and the data read address ADne corresponding to the even field, and used.

The data (f1_1o) read from the address AD1o position is data of just the odd field of all fields making up an output frame.

The switch settings in (5) in FIG. 11 illustrate the setting state of switches 151d and 151b. As described with reference to FIG. 4, in the normal image generating processing mode, the switches 151d and 151b are both set to N side connection.

The data (f1_1o) read out from the memory 130 following these switch settings is supplied to the third signal processing unit 126, subjected to final signal processing, and output as output (VO1o) as a normal image.

The output (VO1o) is output generated based on the data (f1_1o) read out from the address AD1o position, and is output of just the odd field of all fields making up an output frame.

In the next time t3 to t4, the even field output (VO1e) corresponding to the odd field output (VO1o) is generated from data (f1_1e) read out from the memory 130 by the address AD1e, and output.

Thus, with this processing example, odd line output of the imaging device and even line output of the imaging device is read out from the memory 130 every vertical cycle, thereby outputting the imaging apparatus output as odd and even field output VO1o, VO1e, VO2o, VO2e, VO3o, VO3e and so on, and an image with no interlacing blurring can be obtained by synthesizing the output signals in a combination of odd+even.

(4-E) Normal Image Generating Sequence with Progressive Readout and Interlaced Output (Second Example)

Figure 12:
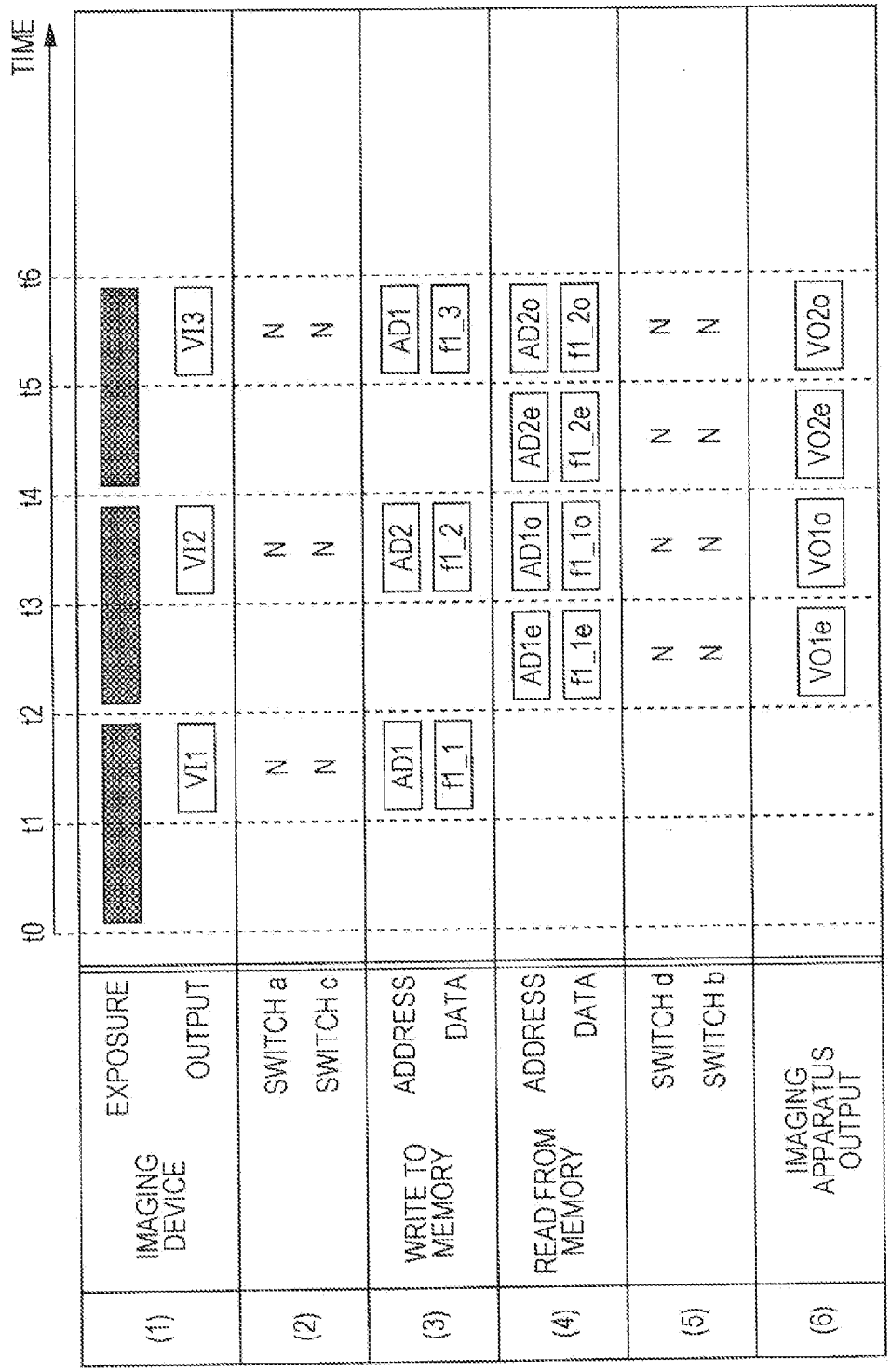
FIG. 12 is a diagram for describing a normal image generating sequence (second example) with progressive readout and interlaced output, which an imaging apparatus according to an embodiment.

Next, the details of a second example of a normal image generating sequence with progressive readout and interlaced output will be described with reference to FIG. 12. FIG. 12 is a diagram illustrating a detailed sequence at the time of performing normal operations (see FIG. 4) for generating a normal image with the imaging apparatus according to the present disclosure, by operating the imaging device with progressive readout and interlaced operation of the imaging apparatus output.

The elapsed time (time t0 to t6) is shown from left to right, and the following data and settings are shown at each of these times.

(1) exposure and output of imaging device 102
(2) settings of switches 151a and 151c
(3) write address to memory 130 and write data
(4) read address from memory 130 and read data
(5) settings of switches 151d and 151b
(6) output of imaging apparatus 100

The time intervals of t0 to t1, t1 to t2, and so on, are equivalent to the vertical cycle which is the signal read cycle from the imaging device 102.

The example shown in FIG. 12 is a normal image generating sequence with progressive read and interlaced output, the same as with FIG. 11 described earlier. The difference between FIGS. 11 and 12 is the sequence of "(6) imaging apparatus output".

With the processing described with reference to FIG. 11, the order of output is VO1o, VO1e, VO2o, VO2e and so on i.e., a configuration of output in the order of odd field and even field.

On the other hand, with the processing described with reference to FIG. 12, the order of output is VO1e, VO1o, VO2e, VO2o and so on i.e., a configuration of output in the order of even field and odd field.

Due to the change in output order, the order of "(4) read from memory" has the even field (f1_1e) read in advance of the odd field (f1_1o). Other points are the same as the processing described earlier with reference to FIG. 11.

With this processing example as well, in the same way as the processing example described earlier with reference to FIG. 11, odd line output of the imaging device and even line output of the imaging device is read out from the memory 130 every vertical cycle, thereby outputting the imaging apparatus output as even and odd field output VO1e, VO1o, VO2e, VO2o, VO3e, VO3o and so on, and an image with no interlacing blurring can be obtained by synthesizing the output signals in a combination of even+odd.

(4-F) Wide Dynamic Range Image Generating Sequence with Progressive Readout and Interlaced Output (First Example)

Next, the details of a wide dynamic range image generating sequence with progressive readout and interlaced output will be described with reference to FIG. 13. FIG. 13 is a diagram illustrating a detailed sequence at the time of performing wide dynamic range operations (see FIG. 5) for generating a wide dynamic range image with the imaging apparatus according to the present disclosure, by operating the imaging device with progressive readout and interlaced operation of the imaging apparatus output.

The elapsed time (time t0 to t6) is shown from left to right, and the following data and settings are shown at each of these times.

(1) exposure and output of imaging device 102
(2) settings of switches 151a and 151c
(3) write address to memory 130 and write data
(4a) read address from memory 130 and read data
(4b) read address from memory 130 and read data
(5) settings of switches 151d and 151b
(6) output of imaging apparatus 100

With this example, data readout from the memory 130 is executed as readout processing of two sets of image data of a long exposure image (high sensitivity image (Hn)) and short exposure image (low sensitivity image (Ln)) to be applied to image synthesizing processing performed at the image synthesizing unit 123. This parallel readout processing corresponds to the processing of (4a) and (4b).

The time intervals t0 to t1, t1 to t2, and so on, are equivalent to the vertical cycle which is the signal read cycle from the imaging device 102. As shown in (1) in FIG. 13, the imaging device 102 outputs (VIL1), (VIH1), (VIL2), (VIH2) and so on as imaging device output as the results of being exposed at each of the vertical cycles (t0 to t1, t1 to t2, and so on). Note that L means the short exposure image (low sensitivity image) and H the long exposure image (high sensitivity image). The numerical values 1, 2, and so on are identification Nos. indicating the order of output from the imaging device.

As shown in (2) FIG. 13, the settings of switches 151a and 151c are all set to the terminal W side in the wide dynamic range image generating mode, as described with reference to FIG. 5 above. Note that these settings are performed by the control unit 105. The processing results of the first signal processing unit 122 are stored in the memory 130 following these switch settings.

As shown in (3) in FIG. 13, four memory addresses AD1, AD2, AD3, and AD4 are repeatedly used in order to sequentially store the data (f2_L1), (f2_H1), (f2_L2), (f2_H2), and so on, as the processing results of the first signal processing unit 122. That is to say, the short exposure image (low sensitivity image (Ln)) and long exposure image (high sensitivity image (Hn)) are sequentially stored.

The format 2 (f2) corresponds to the format described earlier with reference to (2) in FIG. 7, and stores YRGB signals which are the processing results of the first signal processing unit 122 in the second format of (2) in FIG. 7.

Note that the data serving as the processing results of the first signal processing unit 122 for the imaging device output (VIL1) shown in (1) FIG. 13 corresponds to the data (f2_L1) stored in the memory shown in (3) in FIG. 13.

The processing from output from the imaging device 102 to storage in the memory 130 is performed in the period of time t0 to t1. What is performed in this time t0 to t1 is the processing up to storing the data (f2_L1) at the position specified by the memory address AD1 in the format 2 (f2).

In the next time t1 to t2, with the processing of "(1) imaging device" up to "(3) write to memory", the same processing as the processing as to the imaging device output (VIL1) in time t0 to t1 is performed on the next imaging device output (VIH1). Note that the imaging device output (VIL1) and imaging device output (VIH1) in time t0 to t1 are the two images to be subjected to image synthesizing processing for generating a wide dynamic range image.

In "(3) write to memory" in FIG. 13, data (f2_H1) is written to a memory position of an address AD2 different from the address AD1 to which the memory has been stored in time t0 to t1.

In the period of the next time t2 to t3, with the processing of "(1) imaging device" up to "(3) write to memory", the same processing as the processing as to the imaging device output (VIL1) in time t0 to t1 is performed on the next imaging device output (VIL2).

With "(3) write to memory" in FIG. 13, data (f2_L2) is written to a memory position of an address AD3 different from the address AD1 used for memory write in time t0 to t1, and the address AD2 used for memory write in time t1 to t2.

Further, in the period of the next time t2 to t3, processing from "(4) read from memory" through "(6) imaging apparatus output" in FIG. 13 is also performed. This is processing as to the data (f2_L1) written to the memory in time t0 to t1 and the data (f2_H1) written to the memory in time t1 to t2.

As shown in the space "(4a) read from memory" in FIG. 13, the data (f2_L1o) is read out from the address AD1o position. Further, as shown in the space of "(4b) read from memory" in FIG. 13, the data (f2_H1o) is read from the address AD2o position.

Note that address AD1o is a data read address corresponding to the odd field, configuring a part of the address AD1. Address ADn has a configuration which can be separated into the data read address ADno corresponding to the odd field and the data read address ADne corresponding to the even field, and used.

In time t2 to t3, the data (f2_L1o) read from the address AD1o position is odd field data of the short exposure image (low sensitivity image (L)). The data (f2_H1o) read from the address AD2o position is odd field data of the long exposure image (high sensitivity image (H)).

The switch settings in (5) in FIG. 13 illustrate the setting state of switches 151d and 151b. As described with reference to FIG. 5, in the wide dynamic range image generating processing mode, the switches 151d and 151b are both set to W side connection.

The odd field data (f2_L1o) of the short exposure image data (low sensitivity image (L)), and odd field data (f2_H1o) of the long exposure image data (high sensitivity image (H)) read out from the memory 130 following these switch settings are output to the image synthesizing unit 123. The image synthesizing unit 123 performs image synthesizing processing using these two images, and generates a synthesized image corresponding to the odd field of the wide dynamic range image.

Thereafter, the generated wide dynamic range image corresponding to the odd field is output to the image correction unit 124. The image correction unit 124 performs γ correction and outputs the corrected signals to the second signal processing unit 125. At the second signal processing unit 125, the YRGB signals are converted to YCbCr signals for example, and the converted signals are input to the third signal processing unit 126 via switch 151b.

The third signal processing unit 126 executes final signal processing on the readout signal from the memory 130, and generates and outputs a wide dynamic range image to be output from the imaging apparatus. The final output is equivalent to "(6) imaging apparatus output" in FIG. 13 (WV11o).

Note that WV means a wide dynamic range image, and as for the sequence of values thereafter, the first numerical value is an identification No. of the long exposure image (high sensitivity image (H)) and the later numerical value is an identification No. of the short exposure image (low sensitivity image (L)). Here, "o" indicates an odd numbered field image, and "e" indicates an even numbered field image. This imaging apparatus output (WV11o) is an image just of the odd field.

In the following time (t3 to t4), an even field image (WV11e) corresponding to the imaging apparatus output (WV11o) is generated and output. In time t3 to t4, data (f2_L1e) is read from the address AD1e position. Further, as shown in the space of "(4b) read from memory" in FIG. 13, the data (f2_H1e) is read out from the address AD2e position. Note that address AD1e is a data read address corresponding to the even field, configuring a part of the address AD1.

In time t2 to t3, the data (f2_L1e) read from the address AD1e position is even field data of the short exposure image (low sensitivity image (L)). The data (f2_H1e) read from the address AD2e position is even field data of the long exposure image (high sensitivity image (H)).

The switch settings in (5) FIG. 13 illustrate the setting state of switches 151d and 151b. As described with reference to FIG. 5, in the wide dynamic range image generating processing mode, the switches 151d and 151b are both set to W side connection.

The odd field data (f2_L1e) of the short exposure image data (low sensitivity image (L)), and odd field data (f2_H1e) of the long exposure image data (high sensitivity image (H)) read out from the memory 130 following these switch settings are output to the image synthesizing unit 123. The image synthesizing unit 123 performs image synthesizing processing using these two images, and generates a synthesized image corresponding to the even field of the wide dynamic range image.

Thereafter, the generated wide dynamic range image corresponding to the even field is output to the image correction unit 124. The image correction unit 124 performs γ correction and outputs the corrected signals to the second signal processing unit 125. At the second signal processing unit 125, the YRGB signals are converted to YCbCr signals for example, and the converted signals are input to the third signal processing unit 126 via switch 151b.

The third signal processing unit 126 executes final signal processing on the readout signal from the memory 130, and generates and outputs a wide dynamic range image to be output from the imaging apparatus. The final output is equivalent to "(6) imaging apparatus output" in FIG. 13 (WV11e).

This imaging apparatus output (WV11e) is an image just of the odd field. This is output along with the imaging apparatus output (WV11o) in the previous time (t2 to t3), and the entire frame image is displayed.

With this processing example, imaging device outputs VIL1, VIH1, VIL2, VIH2, VIL3, VIH3 and so on of high sensitivity and low sensitivity, obtained by alternating two types of exposure times every vertical cycle, are subjected to signal processing at the first signal processing unit 122, and then stored in the memory 130 sequentially applying four different addresses AD1 through AD4.

Further, the odd line output and even light output of the addresses AD1 through AD4 are read out every vertical cycle, subjected to image synthesizing correction processing, and signal processing, and the imaging apparatus output is output with separate odd and even fields. Due to this processing, as shown in (6) in FIG. 13, the output signals are synthesized as a combination of odd+even as WV11o, WV11e, WV22o, WV22e, and so on, and interlaced output is executed. With this processing example, output of a wide dynamic range image with little interlacing blurring is realized.

(4-G) Wide Dynamic Range Image Generating Sequence with Progressive Readout and Interlaced Output (Second Example)

Next, the details of a second example of a wide, dynamic range image generating sequence with progressive readout and interlaced output will be described with reference to FIG. 14. FIG. 14 is a diagram illustrating a detailed sequence at the time of performing wide dynamic range operations (see FIG. 5) for generating a wide dynamic range image, by operating the imaging device with progressive readout and interlaced operation of the imaging apparatus output.

The elapsed time (time t0 to t6) is shown from left to right, and the following data and settings are shown at each of these times.

(1) exposure and output of imaging device 102
(2) settings of switches 151a and 151c
(3) write address to memory 130 and write data
(4a) read address from memory 130 and read data
(4b) read address from memory 130 and read data
(5) settings of switches 151d and 151b
(6) output of imaging apparatus 100

With this example, data readout from the memory 130 is executed as readout processing of two sets of image data of a long exposure image (high sensitivity image (Hn)) and short exposure image (low sensitivity image (Ln)) to be applied to image synthesizing processing performed at the image synthesizing unit 123. This parallel readout processing corresponds to the processing of (4a) and (4b).

The time intervals of t0 to t1, t1 to t2, and so on, are equivalent to the vertical cycle which is the signal read cycle from the imaging device 102.

The example shown in this FIG. 14 is a wide dynamic range image generating sequence with progressive readout and interlaced output, the same as with the example in FIG. 13 described above. The difference between FIGS. 13 and 14 is the sequence of "(6) imaging apparatus output".

With the processing described with reference to FIG. 13, the order of output is WV11o, WV11e, WV22o, WV22e, and so on i.e., a configuration of output in the order of odd and even fields.

On the other hand, with the processing described with reference to FIG. 14, the order of output is WV11e, WV11o, WV22e, WV22o, and so on i.e., a configuration of output in the order of even and odd fields.

Due to the change in output order, the order of "(4) read from memory" has the even field (f2_H1e) read in advance of the odd field (f2_H1o). Other points are the same as the processing described earlier with reference to FIG. 13.

With this processing example as well, odd line output of the imaging device and even line output of the imaging device is read out from the memory 130 every vertical cycle, thereby outputting the imaging apparatus output as even and odd field output WV11e, WV11o, WV22e, WV22o, and so on, and an image with no interlacing blurring can be obtained by synthesizing the output signals in a combination of even+odd.

(4-H) Wide Dynamic Range Image Generating Sequence with Progressive Readout and Interlaced Output (Third Example)

Next, the details of a third example of a wide dynamic range image generating sequence with progressive readout and interlaced output will be described with reference to FIG. 15.

The processing example shown in FIG. 15 is a wide dynamic range image generating sequence with progressive readout and interlaced output, the same as with the example in FIG. 13. Note however, the processing shown in FIG. 15 differs with regard to the point that the pair of images to be read out from the memory 130 to generate a wide dynamic range image is constantly set to the newest image.

For example, with the sequence shown in FIG. 13, in time t2 to t3, in (4a) readout of the data (f2_L1o) from the address AD1o, and in (4b) readout of the data (f2_H1o) from the address AD2o, are executed, and further, in time t3 to t4, in (4a) readout of the data (f2_L1e) from the address AD1e, and in (4b) readout of the data (f2_H1e) from the address AD2e are executed.

On the other hand, with the sequence shown in FIG. 15, in time t1 to t2, in (4a) readout of the data (f2_L1e) from the address AD1e is executed, and in time t2 to t3, in (4a) readout of the data (f2_L1o) from the address AD1o, and in (4b) readout of the data (f2_H1o) from the address AD1o, are executed, and in the next time t3 to t4, in (4a) readout of the data (f2_L2e) from the address AD3e, and in (4b) readout of the data (f2_H1e) from the address AD2e are executed.

That is to say, this processing example shown in FIG. 15 differs with regard to the point that the newest data is used for read data. With this processing example, of the data available of readout at each readout timing, the newest data is obtained. This processing example is a sequence for generating a wide dynamic range image as a synthesized image using the combination of newest data of the data stored in the memory 130.

In the sequence shown in FIG. 15, the processing of "(1) imaging device" through "(3) write to memory" is the same as with FIG. 13. The readout of data from the memory in time t1 and on differs from FIG. 13 in that settings are made so as to read the newest data from the data already stored in the memory.

The "(5) switch settings" in FIG. 13 show the state of switches 151d and 151b. As described with reference to FIG. 5, in the wide dynamic range image generating processing mode, both the switches 151d and 151b are set to W side connection.

The data read out from the memory 130 following these switch settings is input to the image synthesizing unit 123, and wide dynamic range image generating processing by image synthesizing is performed. Note however, in time t1 to t2, only the short exposure image data (low sensitivity image (L)) (f2_L1e) has been read out from (4a) address AD1e, and readout of the long exposure image data (high sensitivity image (H)) has not been executed, so no image synthesizing processing is executed at this time t1 to t2.

In time t2 to t3, short exposure image data (low sensitivity image (L)) data (f2_L1o), and long exposure image data (high sensitivity image (H)) data (f2_H1o), read out from the memory 130 at (4a) and (4b) respectively, are subjected to image synthesizing processing, and a wide dynamic range image of just the odd field is generated.

Thereafter, the generated wide dynamic range image is output to the image correction unit 124. The image correction unit 124 performs γ correction and outputs the corrected signals to the second signal processing unit 125. At the second signal processing unit 125, the YRGB signals are converted to YCbCr signals for example, and the converted signals are input to the third signal processing unit 126 via switch 151b.

The third signal processing unit 126 executes final signal processing on the readout signal from the memory 130, and generates and outputs a wide dynamic range image to be output from the imaging apparatus. The final output is equivalent to "(6) imaging apparatus output" in FIG. 13 (WV11o).

This imaging apparatus output (WV11o) is an image just of the odd field. This is output along with the imaging apparatus output (WV11e) in the next time (t3 to t4), and the entire frame image is displayed.

As shown in the space of "(4a) read from memory" in FIG. 15, at time t3 to t4, the data (f2_H1e) is read from the address AD3e position.

In time t2 to t3, the data (f2_L2e) read out from the address AD3e position, is even field data of the short exposure image (low sensitivity image (L)). The data (f2_H1e) read out from the address AD2e position, is even field data of the long exposure image (high sensitivity image (H)).

The "(5) switch settings" in FIG. 15 show the state of switches 151d and 151b. As described with reference to FIG. 5, in the wide dynamic range image generating processing mode, both the switches 151d and 151b are set to W side connection.

The even field data (f2_L2e) of the short exposure image data (low sensitivity image (L)), and even field data (f2_H1e) of the long exposure image data (high sensitivity image (H)), read out following these switch settings are output to the image synthesizing unit 123. The image synthesizing unit 123 performs image synthesizing processing using these two images, and generates a synthesized image corresponding to the even field of the wide dynamic range image.

Thereafter, the generated wide dynamic range image is output to the image correction unit 124. The image correction unit 124 performs γ correction and outputs the corrected signals to the second signal processing unit 125. At the second signal processing unit 125, the YRGB signals are converted to YCbCr signals for example, and the converted signals are input to the third signal processing unit 126 via switch 151b.

The third signal processing unit 126 executes final signal processing on the readout signal from the memory 130, and generates and outputs a wide dynamic range image to be output from the imaging apparatus. The final output is equivalent to "(6) imaging apparatus output" FIG. 15 (WV12e). This imaging apparatus output (WV12e) is an image just of the even field. This is output along with the imaging apparatus output (WV11o) in the previous time (t2 to t3), and the entire frame image is displayed.

With this processing example, imaging device outputs VIL1, VIH1, VIL2, VIH2, VIL3, VIH3 and so on of high sensitivity and low sensitivity, obtained by alternating two types of exposure times every vertical cycle, are subjected to signal processing at the first signal processing unit 122, and then stored in the memory 130 sequentially applying four different addresses AD1 through AD4.

Further, the odd line output and even light output of the addresses AD1 through AD4 are read out every vertical cycle, subjected to image synthesizing and correction processing, and signal processing, and the imaging apparatus output is output with separate odd and even fields.

Due to this processing, as shown in (6) in FIG. 15, interlaced output is executed as WV11o, WV12e, WV22o, WV23e, and so on. With this processing example, the combination of the low sensitivity image and high sensitivity image to be applied to wide dynamic range processing can be generated based on newer shot images.

(4-I) Wide Dynamic Range Image Generating Sequence with Progressive Readout and Interlaced Output (Fourth Example)

Next, the details of a fourth example of a wide dynamic range image generating sequence with progressive readout and interlaced output will be described with reference to FIG. 16. FIG. 16 is a diagram illustrating a detailed sequence at the time of performing wide dynamic range operations (see FIG. 5) for generating a wide dynamic range image, by operating the imaging device with progressive readout and interlaced operation of the imaging apparatus output.

The elapsed time (time t0 to t6) is shown from left to right, and the following data and settings are shown at each of these times.
(1) exposure and output of imaging device 102
(2) settings of switches 151a and 151c
(3) write address to memory 130 and write data
(4a) read address from memory 130 and read data
(4b) read address from memory 130 and read data
(5) settings of switches 151d and 151b
(6) output of imaging apparatus 100

With this example, data readout from the memory 130 is executed as readout processing of two sets of image data of a long exposure image (high sensitivity image (Hn)) and short exposure image (low sensitivity image (Ln)) to be applied to image synthesizing processing performed at the image synthesizing unit 123. This parallel readout processing corresponds to the processing of (4a) and (4b).

The time intervals t0 to t1, t1 to t2, and so on, are equivalent to the vertical cycle which is the signal read cycle from the imaging device 102.

The example shown in this FIG. 16 is a wide dynamic range image generating sequence with progressive readout and interlaced output, the same as with the example in FIG. 15 described above. The difference between FIGS. 15 and 16 is the sequence of "(6) imaging apparatus output".

With the processing described with reference to FIG. 15, the order of output is WV11o, WV12e, WV22o, WV23e, and so on i.e., a configuration of output in the order of odd and even fields. On the other hand, with the processing shown in FIG. 16, the order of output is WV11e, WV12o, WV22e, WV23o, and so on i.e., a configuration of output in the order of even and odd fields.

Due to the change in output order, the order of (4) is also changed. That is to say, the order or readout of the even field data and odd field data switches between FIGS. 15 and 16. Other points are the same as the processing described earlier with reference to FIG. 15.

With this processing example as well, odd line output of the imaging device and even line output of the imaging device is read out from the memory 130 every vertical cycle, thereby performing interlaced output of the imaging apparatus output as even and odd field output WV11e, WV12o, WV22e, WV23o, and so on. With this processing example, the combination of the low sensitivity image and high sensitivity image to be applied to wide dynamic range processing can be generated based on newer shot images.

(4-J) Sequence for Switching Between Normal Image Generating and Wide Dynamic Range Image Generating with Progressive Readout and Progressive Output Next, a sequence for switching between normal image generating and wide dynamic range image generating with progressive readout and progressive output will be described with reference to FIG. 17. The processing shown in this FIG. 17 is a processing sequence for switching between the processing described earlier with reference to FIG. 8, and the processing described with reference to FIG. 9, partway. That is, this is processing for switching between (4-A) normal image generating sequence with progressive readout and progressive output (FIG. 8)
(4-B) wide dynamic range image generating sequence with progressive readout and progressive output (First Example) (FIG. 9).

FIG. 17 is a diagram illustrating a detailed sequence in the case of performing switching control between a normal mode for generating a normal image (see FIG. 4), and a wide dynamic range mode (see FIG. 5), with settings of operating the imaging device with progressive readout, and progressive operation for the imaging apparatus output as well.

Note that at the time of switching modes, control is executed to switch all connection settings of switches 151a through 151d, from N-connection to W-connection, or all in reverse from W-connection to N-connection. This switching is performed by the control unit 105.

FIG. 17 shows the elapsed time (time t0 to t17) from left to right, and the following data and settings are shown at each of these times.

(1) exposure and output of imaging device 102
(2) settings of switches 151a and 151c
(3) write address to memory 130 and write data
(4a) read address from memory 130 and read data
(4b) read address from memory 130 and read data
(5) settings of switches 151d and 151b
(6) output of imaging apparatus 100

Up to time Ta (t6), processing is performed in the normal mode operations, which is normal image generating processing. The processing of time t0 to t6 is the processing described earlier with reference to FIG. 8, i.e., processing the same as (4-A) normal image generating sequence with progressive readout and progressive output is performed. The settings shown in "(1) exposure/output of imaging device" through "(6) imaging apparatus output" in FIG. 17 are the same as with the settings for the processing of time t0 to t6 shown in FIG. 8.

At time Ta (t6), the control unit 105 start transition from normal image generating processing to wide dynamic range image generating processing. Note that, as described earlier, this mode switchover processing is performed under automatic control based on analysis results of the taken image by the control unit 105 for example, of based on user instructions by way of the input unit 106.

After time Ta (t6), at the imaging device, short exposure images (low sensitivity image (L)) and long exposure images (high sensitivity image (H)) are alternately taken.

At the time of the switching processing from normal operations to wide dynamic range operations, the control unit 105 performs the following switch control. First, just the switch 151c which is the switch at the input portion of the memory 130 is switched to the W side. This is the switch setting for the period of time Ta (t6) to Tb (t8).

Figure 18:
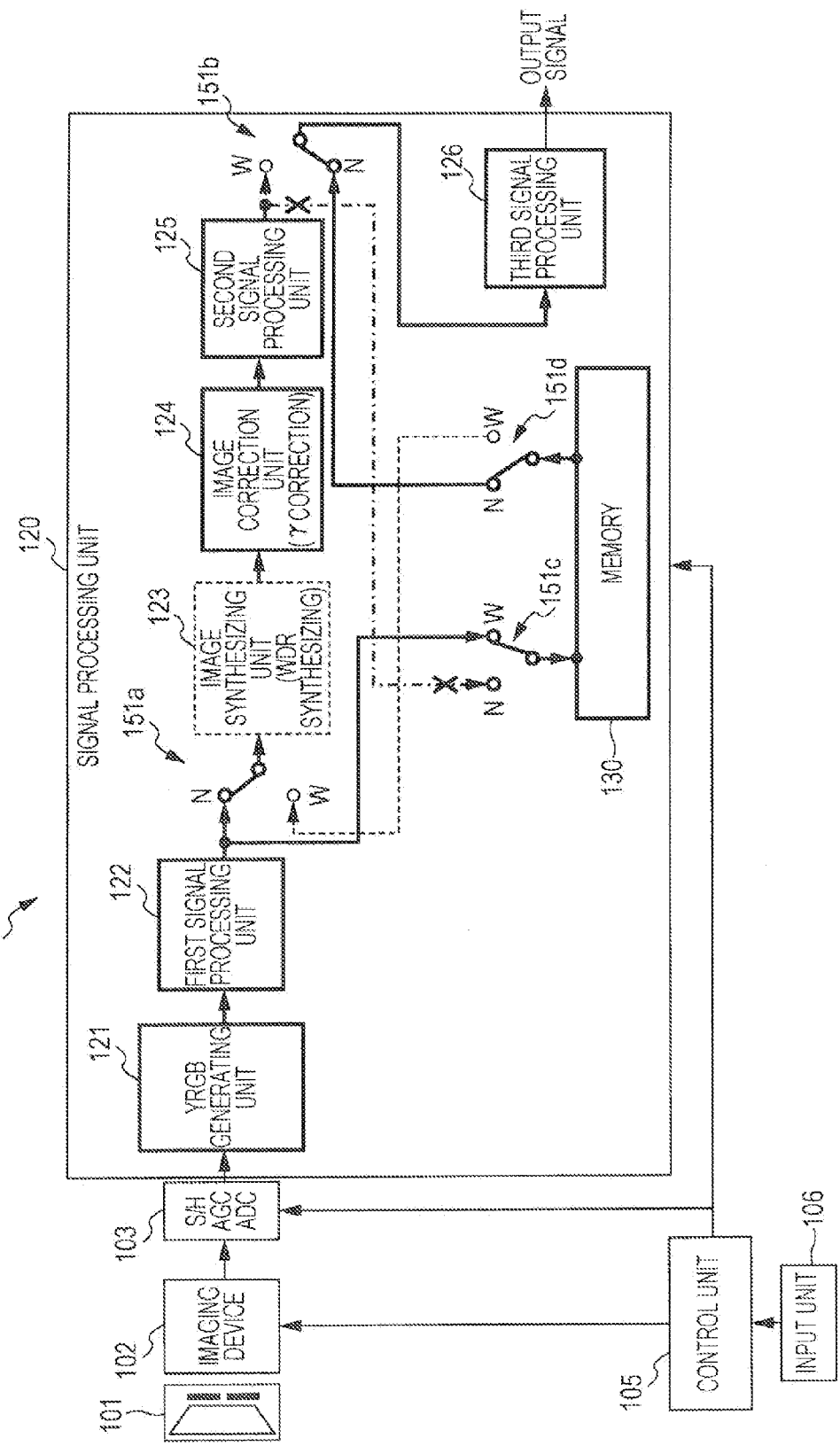
FIG. 18 is a diagram for describing switch settings in a sequence for switching between generating of a normal image and generating of a wide dynamic range image with progressive readout and progressive output, which an imaging apparatus according to an embodiment.

This switch setting is shown in FIG. 18. As shown in FIG. 18, just the switch 151c which is the switch at the input portion of the memory 130 is switched to the W side. The other switches 151a, 151b, and 151d, are left at the N side connection settings.

In time Ta (t6) to Tb (t8), the same address AD2 is maintained for the address for reading data from the memory 130. The output of this period maintains the output of (V06), as indicated by "(6) imaging apparatus output", which is normal output, due to the data read processing applying the same read address.

Also, in time Ta (t6) to Tb (t8), the short exposure image (low sensitivity image (L)) and long exposure image (high sensitivity image (H)) imaged at the imaging device 102 and subjected to signal processing at the first signal processing unit 122 are recorded in the memory 130 via the switch 151c, using addresses other than this read address AD2.

That is, as shown in FIG. 17, in time t6 to t7, short exposure image (low sensitivity image (L)) data (f2_L1) is written following address AD3. In time t7 to t8, long exposure image (high sensitivity image (H)) data (f2_H1) is written following address AD4.

In time Ta (t6) to Tb (t8), following writing the two images to be applied of synthesizing processing for generating the wide dynamic range image, the switches 151a, 151b, and 151d are switched to the W side, i.e., to the wide dynamic range mode settings described with reference to FIG. 5. At this time Tb (t8) switchover from the normal mode to the wide dynamic range mode is completed.

That is to say, at the time of switchover from the normal mode to the wide dynamic range mode, just input data to the memory 130 is switched in advance to that of the wide dynamic range image, and output from the memory 130 and connection of other processing portions are maintained at the settings (N side settings) for the normal mode.

After the image for generating a wide dynamic range image is stored in the memory 130, i.e., at time Tb (t8), the output from the memory 130 and connection of other processing portions are changed to the wide dynamic range mode settings (W side connection).

In FIG. 17, the processing of time Tb (t8) to Tc (t14) is the processing described earlier with reference to FIG. 9, i.e., processing the same as (4-B) wide dynamic range image generating sequence with progressive readout and progressive output (First Example) is performed. The settings shown in "(1) exposure/output of imaging device" through "(6) imaging apparatus output" for time Tb (t8) to Tc (t14) in FIG. 17 are the same as with the settings for the processing of time t0 to t6 shown in FIG. 8.

Note that in time t6 to t8 in FIG. 17, AD3 and AD4 have been used in advance as memory write addresses, so there is offset in the addresses and data identifiers between FIGS. 9 and 17. Still, the processing is the same processing for either.

At time Tc (t14), control unit 105 start transition from wide dynamic range image generating processing to normal image generating processing. Note that, as described above, this mode switching processing is performed under automatic control based on analysis results of the taken image by the control unit 105 for example, of based on user instructions by way of the input unit 106.

From time Tc (t14) on, normal images are sequentially imaged at the imaging device. At the time of performing switchover processing from the wide dynamic range operations to normal operations, the control unit 105 performs the following switching control.

First, just the switch 151c which is the switch at the input portion of the memory 13b is switched to the N side. This is the switch setting for the period of time Tc (t14) to Td (t15).

Figure 19:
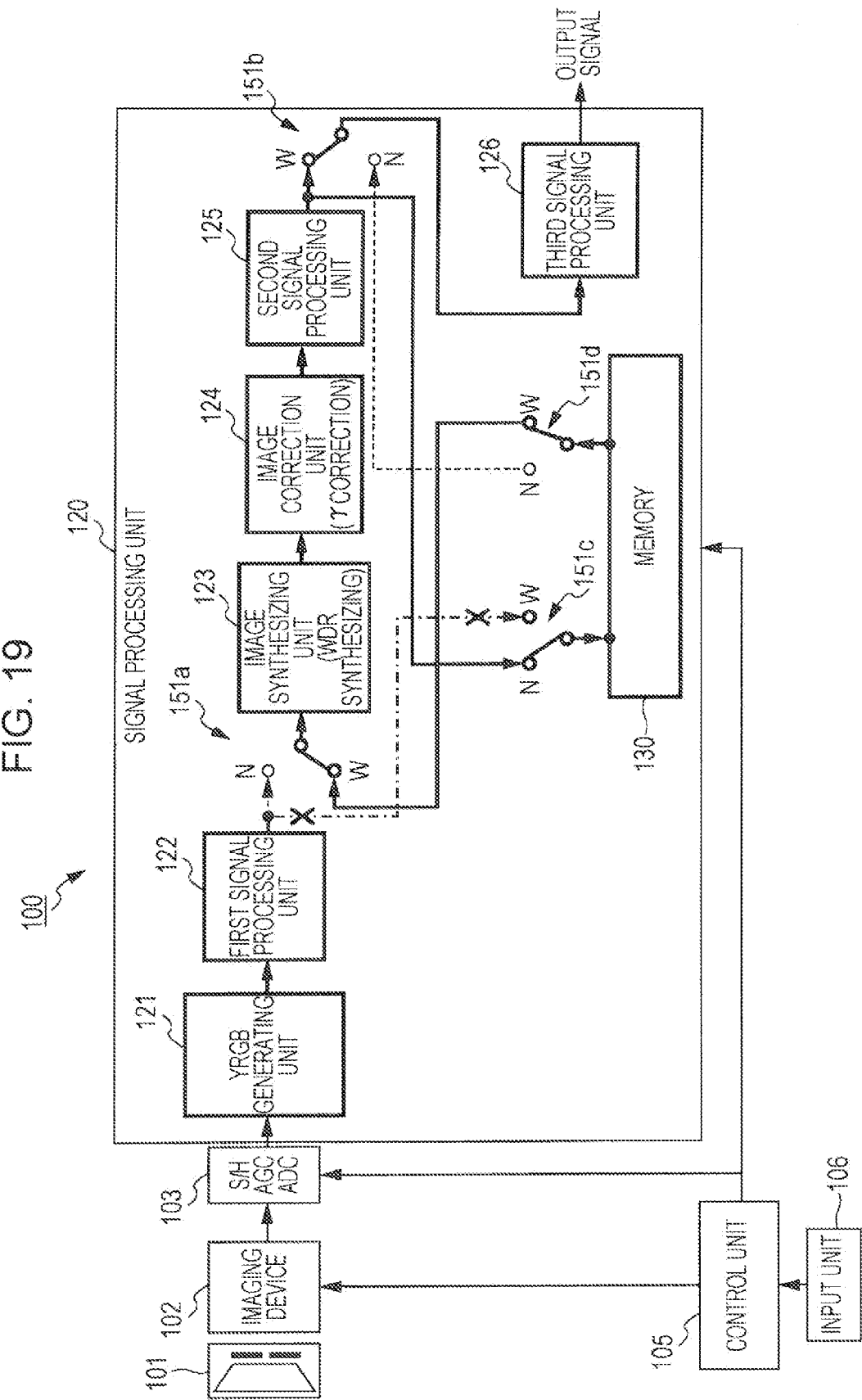
FIG. 19 is a diagram for describing switch settings in a sequence for switching between generating of a normal image and generating of a wide dynamic range image with progressive readout and progressive output, which an imaging apparatus according to an embodiment.

This switch setting is shown in FIG. 19. As shown in FIG. 19, just the switch 151c which is the switch at the input portion of the memory 130 is switched to the N side. The other switches 151a, 151b, and 151d, are left at the W side connection settings.

In time Ta (t14) to Tb (t15), the same addresses AD3 and AD4 from the immediately-previous period t13 to t14 are maintained for the address for reading data from the memory 130. The output of this period maintains the output of (WV33) as indicated by "(6) imaging apparatus output", which is wide dynamic range image output, due to the data read processing applying the same read addresses.

Also, in time Tc (t14) to Td (t15), the normal image imaged at the imaging device 102 and subjected to signal processing at the second signal processing unit 125 is recorded in the memory 130 via the switch 151c, using an address other than this read address.

That is, as shown in FIG. 17, in time Tc (t14) to Td (t15), the address AD1 is made to maintain the same address as the read addresses AD3 and AD4 for the immediately prior time t13 to t14, for the data read address from memory 130. Due to this data read processing applying the same read address, the output of this period is maintained at the output of the wide dynamic range image of (WV33) shown at "(6) imaging apparatus output". The switch 151a is at the W side, a wide dynamic range image (WV33) is generated at the image synthesizing unit 123, and data (f1_WV33) of the wide dynamic range image of the format 1 as the results of processing at the correction unit 124 and second signal processing unit 125 is written to the memory 130 via the switch 151c.

In time Tc (t14) to Td (t15), following writing the normal image to the memory 130, the switches 151a, 151b, and 151d, are switched to the N side, to the normal image mode settings described with reference to FIG. 4. At this time Tc (t14) to Td (t15), a wide dynamic range image is output, and at Te (16), switchover from the wide dynamic range mode to the normal mode is completed.

This switching control is executed under control of the control unit 105. The control unit 105, at time of switching between the normal image generating processing mode and wide dynamic range image generating processing mode, effects control so as to provide a transition period which is set so as to input data corresponding to the mode after data switchover as input data to the memory 130, and output data corresponding to the mode before switching as output data from the memory 130, and after the transition period elapsing, outputting data corresponding to the mode following switching as output data from the memory 130.

Specifically, the control unit 105 performs control such that, in the event that the mode following switching is the wide dynamic range image generating processing mode, the transition period is a period until ending storage of a long exposure image (high sensitivity image) and short exposure image (low sensitivity image) for generating a wide dynamic range image, and in the event that the mode following switching is the normal image generating processing mode, the transition period is a period until ending storage of an image for generating a normal image.

Thus, with the mode switching processing according to the present disclosure, a configuration is made such that just the memory input data is switched over in advance, and at the point that storage of one image data for generating a normal image, or two images for generating a wide dynamic range image, has been completed at the memory, the switches of the memory output data and of the other processing circuits are switched over.

Due to this control, the output from the imaging apparatus at each switching timing is such that one of a normal image or a wide dynamic range image is output in a sure manner, realizing smooth mode switching and image output without any break of images at the time of mode switching.

Figure 20:
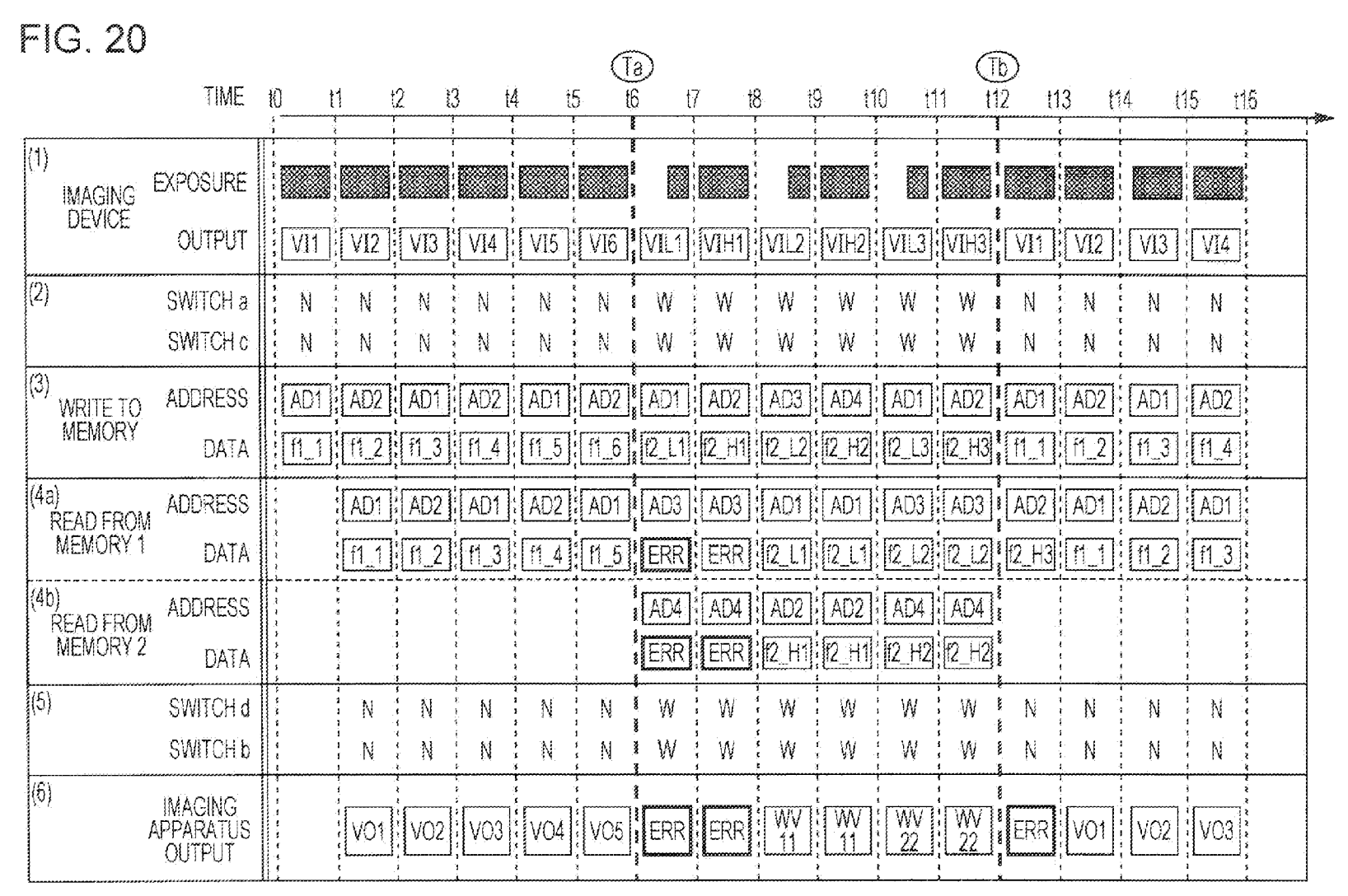

Now, FIG. 20 illustrates a processing sequence of a case in which all switches 151a through d are switched at the same timing, as a reference sequence. As shown in FIG. 20, performing such control results in memory read errors or imaging apparatus output errors occurring for a certain period following mode switching.

For example, at time Ta in FIG. 20, if the switches 151a through 151d are all switched from N to W connection at the time of switching from the normal image mode to the wide dynamic range image mode, wide dynamic range image output will start in a state with no image for generating a wide dynamic range image stored in the memory, resulting in a state where no image can be output ("ERR" in FIG. 20).

At time Tb as well in FIG. 20, if the switches 151a through 151d are all switched from W to N connection at the time of switching from the wide dynamic range image mode to the normal image mode, normal image output will start in a state with no image for generating a normal image stored in the memory, resulting in a state where no image can be output (ERR).

As opposed to this, by executing control such that the memory input data alone is switched in advance, as described with reference to FIG. 17, smooth mode switching and image output switching can be realized without causing errors in the imaging apparatus output.

Also, while processing such as vertical inversion and the like can be performed on the data stored in the memory, for example, and in the case of executing such processing, read/write to the memory 130 can be executed by performing control such as correlating the memory write address at the time of the switch 151c of the input portion of the memory 130 alone being switched, to vertical inversion, or correlating the memory read address immediately following switching the remaining switches 151a, 151b, and 151d, so as to not be vertically inverted for a certain period, or the like. That is to say, the control unit 105 controls data write/read to the memory so as to maintain correlation between addresses and data without error.

With the imaging apparatus according to the present disclosure, when in normal operations generating a normal image, recording in the 422 format of YCrCb of 8 bits each described earlier with reference to FIGS. 6A and 6B can be performed for data stored in memory.

Also, at the time of wide dynamic range operations, a synthesized image is generated at the synthesizing unit based on the two images of a long exposure image (high sensitivity image) and short exposure image (low sensitivity image). At the time of this image synthesizing, synthesizing processing according to pixel value settings where the pixel values of the two images are multiplied by a value smaller than 1 and then added is performed. This synthesizing processing compensates for the insufficient resolution of each image, and an image which has been made to be wide dynamic range is generated.

Also, as described earlier with reference to FIGS. 6A through 7, the data storage to the memory 130 with the imaging apparatus according to the disclosure is performed in different data formats in the normal image generating mode and the wide dynamic range image generating mode.

In the normal image generating mode, storage is performed in a data format (data format 1 (f1)) of signals in the 422 format of one pair of 8-bit color difference signals (Cb, Cr) as to two pixels of 8-bit luminance signals (Y) shown in FIG. 6A, or the 411 format of one pair of color difference signals (Cr, Cb) as to four pixels of luminance signals (Y) shown in FIG. 6B.

Also, in the wide dynamic range image generating mode, storage is performed in a data format (data format 2 (f2)) of signals in the so-called 411 format with resolution of one pair of color signals as to four pixels of luminance signals, with 9 bits of luminance signals (Y), 10 bits of color signals (G), and 9 bits each of color signals (R) and (B).

By using memory storage formats according to the situation in this way, an imaging apparatus is realized enabling output of both images of normal images and wide dynamic range images compatible of the NTSC and PAL formats, using a configuration of one memory device having for example 16-bit data width, 133 MHz access speed, and memory capacity of 64 MB, reduction of memory usage, reduction in mounting area, and reduction on costs, can be realized.

Also, as described with reference to FIG. 17, by performing control to switch the memory input data in advance at the time of mode transition, even if the memory data formats at the time of normal operations and at the time of wide dynamic range operations are different, output or error images due to the data formats being different is prevented, and smooth mode transition can be realized.

The present disclosure has been described so far with reference to a specific embodiment. However, it is self-evident that one skilled in the art can make modifications and substitutions of the embodiment without departing from the essence of the present disclosure. That is to say, disclosure has been made in exemplary form, and should not be interpreted restrictively. Any interpretations of the essence of present disclosure should be made with reference to the Claims.

Also, the series of processing described in the Specification can be executed by hardware, software, or a compounded configuration of both. In the event of executing processing by software, a program recording the processing sequence can be installed in memory in a computer built into dedicated hardware and executed, or the program can be installed in a general-purpose computer capable of executing various types of processing, and executed. For example, the program can be recorded in a recording medium beforehand. Besides installing from a recording medium to a computer, the program can be received via a network such as a LAN (Local Area Network), the Internet, or the like, and installed in a storage medium such as a built-in hard disk or the like.

Note that the various types of processing described in the specification are not restricted to being executed in the described time sequence, and may be executed in parallel or individually in accordance with the processing capacity of the device executing the processing, or as appropriate. Also, in the present specification, the term "system" refers to a logical group configuration of multiple devices, and is not restricted to devices of each configuration being within the same housing.

The present disclosure contains subject matter related to that disclosed in Japanese Priority Patent Application JP 2010-193692 filed in the Japan Patent Office on Aug. 31, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing unit for image signals comprising:
first, second and third signal processing units;
a memory storing image signals;
first, second, third and fourth switches;
wherein a first end of the first switch is connected to an input of the second signal processing unit, a second end of said first switch switching between an output of the memory and an output of the first signal processing unit,
wherein a first end of the second switch is connected to an input of the third signal processing unit, a second end of said second switch switching between the output of the memory and an output of the second signal processing unit,
wherein a first end of the third switch is connected to an input to the memory, a second end of the third switch switching between the output from the second signal processing unit and the output from the first signal processing unit, and
wherein a first end of the fourth switch is connected to the output of the memory, a second end of the fourth switch switching between the input to the third signal processing unit and the input to the second signal processing unit.

2. A signal processing unit according to claim 1, wherein an input/output path of the memory is controlled such that (a) for normal image generation, image signals are stored in the memory and/or read from the memory only after image correction by the second signal processing unit and (b) for wide dynamic range image generation, image signals are stored into the memory and/or read from the memory before the image signals are corrected by the second signal processing unit.

3. The signal processing unit according to claim 1, wherein for normal image generation, the first switch is connected to the output of the first signal processing unit, the second switch is connected to the output of the memory, the third switch is connected to the output of the second signal processing unit, and the fourth switch is connected to the input to the third signal processing unit.

4. The signal processing unit according to claim 1, wherein for a wide dynamic range image generation, the first switch is connected to the output of the memory, the second switch is connected to the output from the second signal processing unit, the third switch is connected to the output of the first signal processing unit, and the fourth switch is connected to the input of the second signal processing unit.

5. The signal processing unit according to claim 1, wherein the second signal processing unit includes a synthesizing unit generating a wide dynamic range image from image signals stored in the memory and executing an image synthesizing process,
wherein for normal image generation, the image synthesizing process is not executed by the synthesizing unit.

6. The image processing unit according to claim 1, wherein the second signal processing unit includes
an image synthesizing unit generating a wide dynamic range signal stored in the memory and executing image synthesizing processing,
an image correction unit correcting the image unit signals, and
a signal processing device converting image signals into color difference signals,
wherein for normal image generation, the image synthesizing processing is not executed by the image synthesizing unit.

7. A signal processing unit which switches processing between a normal image generation operation and a wide dynamic range image generation operation in response to control signals from a controller, the signal processing unit comprising:
an input terminal receives image signals;
a memory storing the image signals,
an image correction unit corrects the image signals; and
switching devices, connected to the input terminal, the memory and the image correction unit, switching input/output paths of the memory to/from the image correction unit, wherein for normal image generation the image signals output from the image correction unit are input to the memory for storage and for wide dynamic range image generation the image signals output from the input terminal are input to the memory for storage.

8. The signal processing unit according to claim 7, wherein the input/output paths are controlled such that (a) for normal image generation, image signals are stored in the memory and/or read from the memory only after image correction by the image correction unit and (b) for wide dynamic range image generation, image signals are stored into the memory and/or read from the memory before the image signals are corrected by the image correction unit.

9. The signal processing unit according to claim 7,
wherein the switching devices include first, second, third, and fourth switches,
wherein a first end of the first switch is connected to an input of the image correction unit, a second end of said first switch switching between an output of the memory and an input image signal,
wherein a first end of the second switch is connected to an output of the signal processing unit, a second end of said second switch switching between an output of the memory and an output of the image correction unit,
wherein a first end of the third switch is connected to the input to the memory, a second end of the third switch switching between the output from the image correction unit and the input image signal, and
wherein a first end of the fourth switch is connected to the output of the memory, a second end of the fourth switch switching between the output of the signal processing unit and the input to the image correction unit.

10. The signal processing unit according to claim 9,
wherein for normal image generation, the first switch is connected to the input image signal, the second switch is connected to the output of the memory, the third switch is connected to the output of the image correction unit, and the fourth switch is connected to the output of the signal processing unit.

11. The signal processing unit according to claim 9,
wherein for a wide dynamic range image generation, the first switch is connected to the output of the memory, the second switch is connected to the output from the image correction unit, the third switch is connected to the input image signal, and the fourth switch is connected to the input of the image correction unit.

12. The signal processing unit according to claim 7,
further comprising an image synthesizing unit generating a wide dynamic range image from image signals stored in the memory and executing image synthesizing processing,
wherein for normal image generation, the image synthesizing processing is not executed by the image synthesizing unit.

13. The signal processing unit according to claim 7,
further comprising a signal processing device converting image signals into color different signals, and an image synthesizing unit generating a wide dynamic range image from image signals stored in the memory and executing image synthesizing processing,
wherein for normal image generation, image synthesizing processing is not executed by the image synthesizing unit.

14. An image signal processing system comprising:
an input terminal receives image signals;
a memory storing the image signals;
a control unit executing signal path control of input/output paths of the memory;
a signal processing unit including
  an image correction unit corrects the image signals, and
  an image synthesizing unit generating a wide dynamic range image from the image signals stored in the memory and executing image synthesizing processing;
switching units, connected to the input terminal, the memory and the signal processing unit, switching signal paths of the memory to/from the signal processing unit, wherein for normal image generation the image signals output from the signal processing unit are input to the memory for storage and for wide dynamic range image generation the image signal output from the input terminal are input to the memory for storage.

15. The image signal processing system according to claim 14,
wherein the input/output paths of the memory are controlled such that (a) for normal image generation, image signals are stored in the memory and/or read from the memory only after image correction by the image correction unit and (b) for wide dynamic range image generation, image signals are stored into the memory and/or read from the memory before the image signals are (1) synthesized by the synthesizing unit and (2) corrected by the image correction unit.

16. The image signal processing system according to claim 14,
wherein for normal image generation, image synthesizing process is not executed by the synthesizing unit.

17. The image signal processing system according to claim 14,
wherein the switching units include first, second, third and fourth switches,
wherein a first end of the first switch is connected to an input of the signal processing unit, a second end of said first switch switching between an output of the memory and an input image signal,
wherein a first end of the second switch is connected to an output of the image signal processing system, a second end of said second switch switching between an output of the memory and an output of the signal processing unit,
wherein a first end of the third switch is connected to the input to the memory, a second end of the third switch switching between the output from the signal processing unit and the input image signal, and
wherein a first end of the fourth switch is connected to the output of the memory, a second end of the fourth switch switching between the output of the signal processing system and the input to the signal processing unit.

18. The image signal processing system according to claim 17,
wherein for normal image generation, the first switch is connected to the input image signal, the second switch is connected to the output of the memory, the third switch is connected to the output of the signal processing unit, and the fourth switch is connected to the output of the processing system.

19. The image signal processing system according to claim 17,
wherein for a wide dynamic range image generation, the first switch is connected to the output of the memory, the second switch is connected to the output from the signal processing unit, the third switch is connected to the input image signal, and the fourth switch is connected to the input of the signal processing unit.

20. The image signal processing system according to claim 14,
wherein the signal processing unit further comprising a signal processing device converting image signals into color different signals.

* * * * *